US012573374B2

(12) United States Patent      (10) Patent No.:   US 12,573,374 B2

Kim et al.           (45) Date of Patent:   \*Mar. 10, 2026

---

(54) TEXT-TO-SPEECH SYNTHESIS METHOD AND APPARATUS USING MACHINE LEARNING, AND COMPUTER-READABLE STORAGE MEDIUM

(71) Applicant: NEOSAPIENCE, INC., Seoul (KR)

(72) Inventors: Taesu Kim, Suwon-si (KR); Younggun Lee, Seoul (KR)

(73) Assignee: NEOSAPIENCE, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,078

(22) Filed: Oct. 19, 2022

(65) Prior Publication Data

US 2023/0067505 A1     Mar. 2, 2023

Related U.S. Application Data

(63) Continuation of application No. 16/682,438, filed on Nov. 13, 2019, now Pat. No. 11,514,887, which is a (Continued)

(30) Foreign Application Priority Data

| Jan. 11, 2018 | (KR) | .......................... 10-2018-0004066 |
| Jan. 12, 2018 | (KR) | .......................... 10-2018-0004234 |

(Continued)

(51) Int. Cl.
    *G10L 13/033*     (2013.01)
    *G06N 3/04*       (2023.01)
    (Continued)

(52) U.S. Cl.
    CPC ................ *G10L 13/10* (2013.01); *G06N 3/04* (2013.01); *G06N 3/084* (2013.01);
    (Continued)

(58) Field of Classification Search
    CPC ..... G10L 13/10; G10L 13/033; G10L 13/047; G10L 13/08; G10L 15/02; G10L 25/30;
    (Continued)

(56) References Cited

U.S. PATENT DOCUMENTS

| 5,559,927 | A | * | 9/1996 | Clynes | .................. G10L 13/033 |
| | | | | | 704/266 |
| 6,177,624 | B1 | * | 1/2001 | Takahashi | ................ G10H 1/36 |
| | | | | | 84/634 |

(Continued)

FOREIGN PATENT DOCUMENTS

| JP | 2008268478 A | * | 11/2008 |
| JP | 2017032839 A | | 2/2017 |
| KR | 1020140120560 A | | 10/2014 |

OTHER PUBLICATIONS

Brady et al, "Multi-modal audio, video and physiological sensor learning for continuous emotion prediction", 2016, InProceedings of the 6th International Workshop on Audio/Visual Emotion Challenge Oct. 16, 2016 (pp. 97-104). (Year: 2016).*

(Continued)

*Primary Examiner* — Olujimi A Adesanya

(74) *Attorney, Agent, or Firm* — Dinsmore & Shohl LLP; Yongsok Choi, Esq.

(57)          ABSTRACT

A text-to-speech synthesis method using machine learning, the text-to-speech synthesis method is disclosed. The method includes generating a single artificial neural network text-to-speech synthesis model by performing machine learning based on a plurality of learning texts and speech data corresponding to the plurality of learning texts, receiving an input text, receiving an articulatory feature of a speaker, generating output speech data for the input text reflecting the articulatory feature of the speaker by inputting (Continued)

the articulatory feature of the speaker to the single artificial neural network text-to-speech synthesis model.

18 Claims, 11 Drawing Sheets

Related U.S. Application Data continuation of application No. PCT/KR2019/000512, filed on Jan. 11, 2019.

(30)     Foreign Application Priority Data

| | | | |
|---|---|---|---|
| Jan. 12, 2018 | (KR) | .................. | 10-2018-0004235 |
| Jan. 11, 2019 | (KR) | .................. | 10-2019-0004186 |

(51) Int. Cl.

| | |
|---|---|
| *G06N 3/084* | (2023.01) |
| *G10L 13/047* | (2013.01) |
| *G10L 13/10* | (2013.01) |
| *G10L 15/02* | (2006.01) |

(52) U.S. Cl.
CPC ........ *G10L 13/0335* (2013.01); *G10L 13/047* (2013.01); *G10L 15/02* (2013.01)

(58) Field of Classification Search
CPC ......... G10L 13/06; G10L 13/02; G10L 13/04; G06N 3/04; G06N 3/08; G06N 20/00
See application file for complete search history.

(56)     References Cited

U.S. PATENT DOCUMENTS

| | | | | |
|---|---|---|---|---|
| 8,115,089 | B2 | 2/2012 | Saino et al. | |
| 8,907,195 | B1 * | 12/2014 | Erol ..................... | G10H 1/361 |
| | | | | 84/649 |
| 9,093,067 | B1 | 7/2015 | Jansche et al. | |
| 10,304,477 | B2 * | 5/2019 | van den Oord ........ | G06N 3/084 |
| 10,347,238 | B2 * | 7/2019 | Jin .......................... | G10L 13/08 |
| 2002/0055843 | A1 | 5/2002 | Sakai | |
| 2003/0023442 | A1 | 1/2003 | Akabane et al. | |
| 2004/0193421 | A1 | 9/2004 | Blass | |
| 2005/0187772 | A1 | 8/2005 | Azara et al. | |
| 2008/0201150 | A1 | 8/2008 | Tamura et al. | |
| 2008/0235024 | A1 | 9/2008 | Goldberg et al. | |
| 2008/0243508 | A1 | 10/2008 | Masuko et al. | |
| 2009/0076819 | A1 | 3/2009 | Wouters et al. | |
| 2009/0204395 | A1 | 8/2009 | Kato et al. | |
| 2009/0234652 | A1 | 9/2009 | Kato et al. | |
| 2010/0082345 | A1 | 4/2010 | Wang et al. | |
| 2010/0233661 | A1 * | 9/2010 | Franzblau ................ | G09B 5/02 |
| | | | | 434/178 |
| 2012/0191457 | A1 | 7/2012 | Minnis et al. | |
| 2013/0262096 | A1 | 10/2013 | Reiner et al. | |
| 2013/0262119 | A1 * | 10/2013 | Latorre-Martinez ... | G10L 13/08 |
| | | | | 704/260 |
| 2014/0052446 | A1 * | 2/2014 | Mori ...................... | G10L 13/10 |
| | | | | 704/260 |
| 2014/0085181 | A1 * | 3/2014 | Roseway ................ | G06F 3/002 |
| | | | | 345/156 |
| 2014/0358547 | A1 | 12/2014 | Fernandez et al. | |
| 2015/0058019 | A1 * | 2/2015 | Chen ...................... | G10L 13/08 |
| | | | | 704/260 |
| 2015/0081306 | A1 * | 3/2015 | Mori ..................... | G10L 13/033 |
| | | | | 704/260 |
| 2015/0186359 | A1 | 7/2015 | Fructuoso et al. | |
| 2016/0140951 | A1 * | 5/2016 | Agiomyrgiannakis ...................... | |
| | | | | G10L 13/02 |
| | | | | 704/260 |
| 2016/0140952 | A1 | 5/2016 | Graham | |
| 2017/0031559 | A1 * | 2/2017 | Lee ........................... | G06F 3/14 |
| 2017/0092258 | A1 | 3/2017 | Edrenkin | |
| 2017/0162187 | A1 | 6/2017 | Ohtani et al. | |
| 2017/0263237 | A1 | 9/2017 | Green et al. | |
| 2018/0096677 | A1 * | 4/2018 | Pollet ..................... | G06N 3/045 |
| 2018/0130459 | A1 * | 5/2018 | Paradiso ................. | G06T 13/00 |
| 2018/0182373 | A1 * | 6/2018 | Almudafar-Depeyrot ................... | |
| | | | | G06F 40/30 |
| 2018/0336880 | A1 * | 11/2018 | Arik ........................ | G10L 25/30 |
| 2019/0019500 | A1 * | 1/2019 | Jang ...................... | G10L 15/063 |
| 2019/0122651 | A1 * | 4/2019 | Arik ........................ | G10L 13/08 |
| 2019/0172443 | A1 * | 6/2019 | Shechtman ........... | G10L 13/047 |
| 2019/0251952 | A1 * | 8/2019 | Arik ........................ | G10L 13/08 |
| 2019/0272818 | A1 | 9/2019 | Fernandez et al. | |
| 2019/0286943 | A1 | 9/2019 | Leskovec et al. | |
| 2019/0348020 | A1 * | 11/2019 | Clark .................... | G10L 13/047 |
| 2020/0105263 | A1 * | 4/2020 | Barrowes ................ | G06F 3/167 |
| 2020/0194027 | A1 * | 6/2020 | Liang ..................... | G10L 25/48 |

OTHER PUBLICATIONS

Makki et al, "Voice conversion using nonlinear principal component analysis", 2007, In 2007 IEEE Symposium on Computational Intelligence in Image and Signal Processing Apr. 1, 2007 (pp. 336-339). IEEE. (Year: 2007).*

International Search Report for PCT/KR2019/000512 of Apr. 2, 2019.

Yu, et al., "BLTRCNN-Based 3-D Articulatory Movement Prediction: Learning Articulatory Synchronicity From Both Text And Audio Inputs," IEEE Transactions on Multimedia, Dec. 17, 2018; 21(7):1621-32.

Lee, et al.; "Voice Imitating Text-to-Speech Neural Networks"; arxiv.org; Cornell University Library, 201 Olin Library Cornell University Ithaca, NY 14583; Jun. 4, 2018; 8 pgs.

Younggun Lee, et al., "Emotional End-to-End Neural Speech synthesizer," Journal, Nov. 28, 2017.

Yaniv Taigman, et al., "Voiceloop: Voice Fitting and Synthesis via a Phonological Loop," Article, arXiv:1707.06588v2 [cs.LG], Facebook AI Research, Oct. 27, 2017.

Sercan Ö. Arik, et al., "Deep Voice 2: Multi-Speaker Neural Text-to-Speech," Journal, 31st Conference on Neural Information Processing Systems (NIPS), Sep. 20, 2017, Long Beach, CA, USA.

Wang, et al., "Enhance The Word Vector With Prosodic Information For The Recurrent Neural Network Based TTS System," Interspeech, Sep. 2016, pp. 2856-2860.

Xin Wang, et al., "Using Continuous Representation of Various Linguistic Units for Recurrent Neural Network based TTS Synthesis," IPSJ SIG Technical Report, vol. 2016-SLP-110 No.7, sections 2, 4.2 of abstract, Feb. 6, 2016.

Wang, et al., Word Embedding For Recurrent Neural Network Based TTS Synthesis, IEEE International Conference on Acoustics, Speech and Signal Processing (ICASSP), Apr. 19, 2015, pp. 4879-4883.

Spais, et al., "An Enhanced Pitch Modeling Supporting A Greek Text To Speech System," 2004, WSEAS Transactions on Circuits and Systems, Dec. 17, 2004; 3(10):2168-72.

* cited by examiner

START

GENERATE SINGLE ARTIFICIAL NEURAL NETWORK TEXT-TO-SPEECH SYNTHESIS MODEL — 310

RECEIVE INPUT TEXT — 320

RECEIVE ARTICULATORY FEATURE OF SPEAKER — 330

CONVERT INPUT TEXT INTO OUTPUT SPEECH DATA REFLECTING ARTICULATORY FEATURE OF SPEAKER — 340

END

TEXT    :    HELLO THIS IS SPEECH SYNTHESIS

ADJUST VOICE

GENDER

MALE ———————————————●——————— FEMALE

AGE

10S ————●——————————————————— 60S

ACCENT

GYEONGGI

CHUNGCHEONG

GANGWON

JEOLLA        GYEONGSANG

TEXT-TO-SPEECH SYNTHESIS METHOD AND APPARATUS USING MACHINE LEARNING, AND COMPUTER-READABLE STORAGE MEDIUM

CROSS-REFERENCE TO RELATED APPLICATIONS

This application is a continuation of U.S. patent application Ser. No. 16/682,438 filed on Nov. 13, 2019, which is a continuation of International Patent Application No. PCT/KR2019/000512 filed on Jan. 11, 2019, which claims priority to Korean Patent Application No. 10-2018-0004066 filed on Jan. 11, 2018, Korean Patent Application No. 10-2018-0004234 filed on Jan. 12, 2018, Korean Patent Application No. 10-2018-0004235 filed on Jan. 12, 2018, and Korean Patent Application No. 10-2019-0004186 filed on Jan. 11, 2019, the entire contents of which are herein incorporated by reference.

TECHNICAL FIELD

The present disclosure relates to a method of receiving an input text and synthesizing a speech from the input text and an apparatus for reproducing the synthesized speech.

BACKGROUND ART

Speech is one basic and effective tool for delivering human intentions. Speech-based communication provides an intuitive and convenient service to a user, and some devices use an interactive speech user interface using speeches. A simple way to implement a speech response in a conventional speech user interface is audio recording, which has limitations in that only a recorded speech can be used. Such a device has low utility because it cannot provide a response service for a speech that is not recorded. For example, since a user's queries can be arbitrary to artificial intelligence (AI) agents, such as Apple Siri and Amazon Alexa, a variety of sentences should be able to be generated to provide a response service for the user's query. Recording all possible responses through these applications requires significant time and cost. In this environment, many researchers are trying to create natural and fast speech synthesis models. Also, text-to-speech synthesis which can generate a speech from a text, which is also called TTS, has been widely studied.

Generally, TTS technology has various speech synthesis methods such as Concatenative TTS and Parametric TTS. For example, Concatenative TTS can divide and store a speech in very short units such as phonemes, combine phonemes constituting a sentence to be synthesized, and synthesize a speech, and Parametric TTS can express speech features by parameters and synthesize a speech corresponding to a sentence to be synthesized from parameters indicative of speech features constituting the sentence by means of a vocoder.

Recently, an artificial neural network (e.g., deep neural network)-based speech synthesis method has been actively studied, and a speech synthesized according to this speech synthesis method includes much more natural speech features than those of conventional methods. However, in order to provide a speech synthesis service for a new speaker in an artificial neural network-based speech synthesis method, a lot of data corresponding to the speaker's voice is required, and the re-learning of the artificial neural network model using this data is also required.

SUMMARY

The present disclosure relates to a speech synthesis method and apparatus capable of providing output speech data for an input text reflecting an articulatory feature of a new speaker without entering a lot of data or information about the new speaker. Also, the method and apparatus according to the present disclosure may provide a speech synthesis service by expanding a new speaker without separate machine learning.

According to one embodiment of the present disclosure, a text-to-speech synthesis method using machine learning includes: generating a single artificial neural network text-to-speech synthesis model by performing machine learning based on a plurality of learning texts and speech data corresponding to the plurality of learning texts; receiving an input text; receiving an articulatory feature of a speaker; and generating output speech data for the input text reflecting the articulatory feature of the speaker by inputting the articulatory feature of the speaker to the single artificial neural network text-to-speech synthesis model.

According to one embodiment of the present disclosure, in the text-to-speech synthesis method, receiving of the articulatory feature of the speaker includes: receiving a speech sample; and extracting an embedding vector indicative of the articulatory feature of the speaker from the speech sample.

According to one embodiment of the present disclosure, in the text-to-speech synthesis method, extracting the embedding vector indicative of the articulatory feature of the speaker from the speech sample includes extracting a first sub-embedding vector indicative of a prosody feature of the speaker, wherein the prosody feature includes at least one of information on utterance speed, information on accentuation, information on pause duration, or information on voice pitch, and generating the output speech data for the input text reflecting the articulatory feature of the speaker includes generating output speech data for the input text reflecting the prosody feature of the speaker by inputting the first sub-embedding vector indicative of the prosody feature to the single artificial neural network text-to-speech synthesis model.

According to one embodiment of the present disclosure, in the text-to-speech synthesis method, extracting the embedding vector indicative of the articulatory feature of the speaker from the speech sample includes extracting a second sub-embedding vector indicative of an emotion feature of the speaker, wherein the emotion feature includes information on an emotion implied in what the speaker utters, and generating the output speech data for the input text reflecting the articulatory feature of the speaker includes generating output speech data for the input text reflecting the emotion feature of the speaker by inputting the second sub-embedding vector indicative of the emotion feature to the single artificial neural network text-to-speech synthesis model.

According to one embodiment of the present disclosure, in the text-to-speech synthesis method, extracting the embedding vector indicative of the articulatory feature of the speaker from the speech sample includes extracting a third sub-embedding vector indicative of a feature related to a voice tone and pitch of the speaker, and generating the output speech data for the input text reflecting the articulatory feature of the speaker includes generating output speech data for the input text reflecting the feature related to the voice tone and pitch of the speaker by inputting the third sub-embedding vector indicative of the feature related to the voice tone and pitch of the speaker to the single artificial neural network text-to-speech synthesis model.

According to one embodiment of the present disclosure, in the text-to-speech synthesis method, generating the output speech data for the input text reflecting the articulatory feature of the speaker includes: receiving an additional input for the output speech data; modifying the embedding vector indicative of the articulatory feature of the speaker based on the additional input; and converting the output speech data into speech data for the input text reflecting information included in the additional input by inputting the modified embedding vector to the single artificial neural network text-to-speech synthesis model.

According to one embodiment of the present disclosure, in the text-to-speech synthesis method, the information included in the additional input for the output speech data includes at least one of gender information, age information, regional accent information, articulation speed information, voice pitch information, or articulation level information.

According to one embodiment of the present disclosure, in the text-to-speech synthesis method, receiving the speech sample includes receiving a speech input from the speaker within a predetermined time period as the speech sample in real time.

According to one embodiment of the present disclosure, in the text-to-speech synthesis method, receiving the speech sample includes receiving a speech input from the speaker within a predetermined time period from a speech database.

Further, a program for implementing the above-mentioned text-to-speech synthesis method may be record in a computer-readable storage medium.

Further, apparatus, technical means, etc. associated with the above-mentioned text-to-speech synthesis method may be also disclosed.

DETAILED DESCRIPTION

Figure 1:
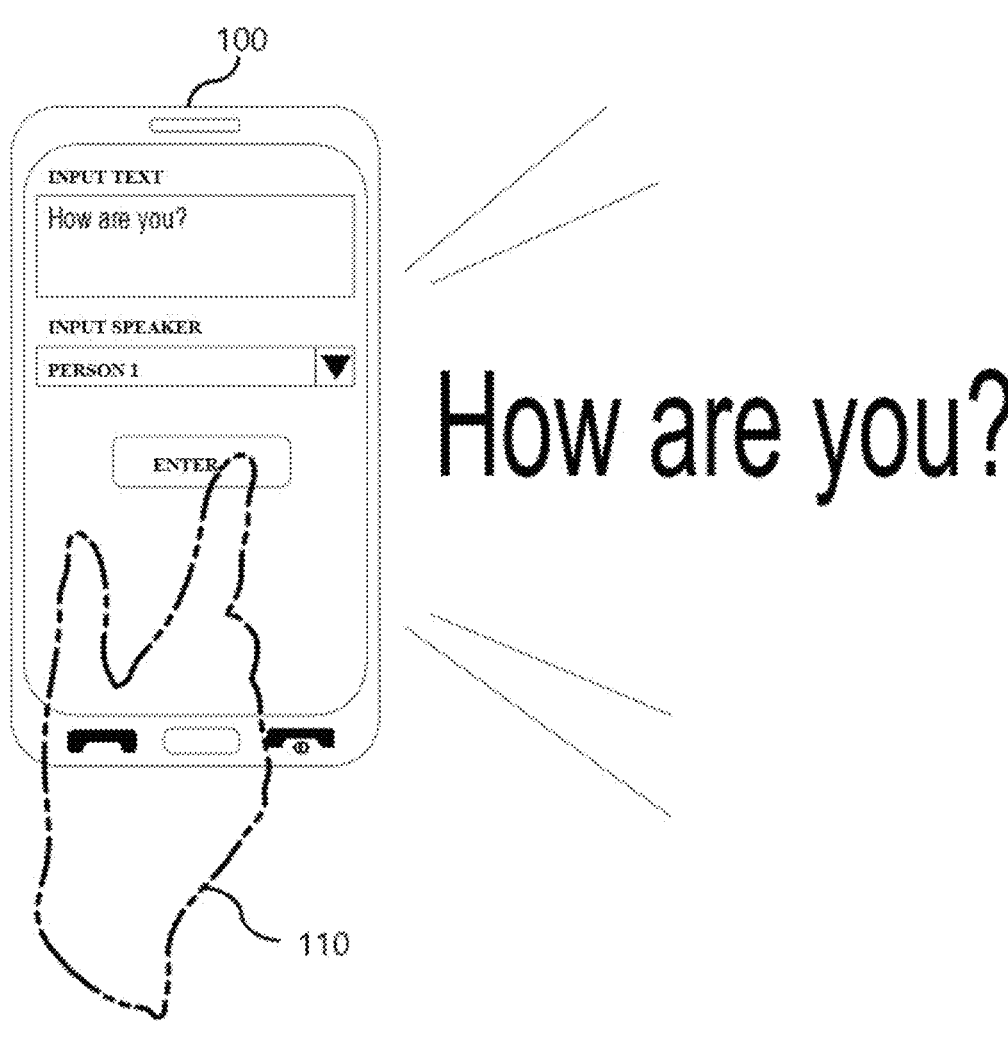
FIG. 1 is a diagram showing a text-to-speech synthesis terminal according to an embodiment of the present disclosure.

Advantages and features of the disclosed embodiments and methods of accomplishing the same will be apparent by referring to embodiments described below in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art.

Terms used herein will be briefly described, and disclosed embodiments will be described in detail below.

The terms used herein have been selected as general terms which are widely used at present in consideration of the functions of the present disclosure, and this may be altered according to the intent of an operator skilled in the art, conventional practice, or introduction of new technology. Also, in a specific case, a term is arbitrarily selected by the applicant, and a meaning of the term will be described in detail in a corresponding description portion of the exemplary embodiments. Therefore, the terms used herein should be defined based on the overall content of the present disclosure instead of a simple name of each of the terms.

As used herein, the singular forms "a," "an," and "the" are intended to include the plural forms as well unless the context clearly indicates the singular forms. Also, the plural forms are intended to include the singular forms as well, unless the context clearly indicates the plural forms.

Furthermore, when one part is referred to as "comprising" (or "including" or "having") other elements, the part can comprise (or include or have) only those elements or other elements as well as those elements unless specifically described otherwise.

The term "unit" used herein denotes a software or hardware component, and the "unit" performs a specific role. However, the meaning of the "unit" is not limited to software or hardware. The "unit" may be configured to be in an addressable storage medium or to execute one or more processors. Accordingly, as an example, the "unit" includes elements such as software elements, object-oriented software elements, class elements, and task elements, processes, functions, attributes, procedures, subroutines, program code segments, drivers, firmware, micro-codes, circuits, data, database, data structures, tables, arrays, and variables. Furthermore, functions provided in the elements and the "units" may be combined as a smaller number of elements and "units" or further divided into additional elements and "units."

According to an embodiment of the present disclosure, the "unit" may be implemented as a processor or a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), nonvolatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

Hereinafter, exemplary embodiments will be fully described with reference to the accompanying drawings in such a way that those skilled in the art can easily carry out the embodiments. Further, in order to clearly illustrate the present invention, parts not related to the description are omitted in the drawings.

FIG. 1 is a diagram showing a text-to-speech synthesis terminal 100 according to an embodiment of the present disclosure.

The text-to-speech synthesis terminal 100 may include at least one processor and at least one memory. For example, the text-to-speech synthesis terminal 100 may be implemented in a smartphone, a computer, a cellular phone, or the like. The text-to-speech synthesis terminal 100 may communicate with an external apparatus (e.g., a server apparatus) by including a communication unit.

The text-to-speech synthesis terminal 100 may receive a text input and a specific speaker input from a user 110. For example, as shown in FIG. 1, the text-to-speech synthesis terminal 100 may receive "How are you?" as the text input. Also, the text-to-speech synthesis terminal 100 may receive "Person 1" as the speaker input. Here, "Person 1" may indicate an articulatory feature of a predetermined speaker, that is, "Person 1." The text-to-speech synthesis terminal 100 may be configured to preset at least one articulatory feature (e.g., "Person 1") among articulatory features of a plurality of people. For example, the articulatory features of the plurality of people may be received from an external apparatus such as a server apparatus through the communication unit. FIG. 1 shows a user interface capable of designating a predetermined speaker. However, the present invention is not limited thereto. The user may provide a speech for a specific text to the text-to-speech synthesis terminal 100, and the text-to-speech synthesis terminal 100 may extract an articulatory feature of the received speech and display a user's articulatory feature to be selected for speech synthesis. For example, the articulatory feature of the speech may be extracted from the received speech and may be represented as an embedding vector.

The text-to-speech synthesis terminal 100 may be configured to output speech data for an input text reflecting an articulatory feature of the designated speaker. For example, as shown in FIG. 1, when output speech data for the input text "How are you" is generated, the output speech data may reflect an articulatory feature of the selected "Person 1." Here, an articulatory feature of a specific speaker may simulate the speaker's voice and also may include at least one of a variety of factors, such as style, prosody, emotion, tone, pitch, etc. included in the articulation. In order to generate the output speech data, the text-to-speech synthesis terminal 100 may provide an input text and a designated speaker to a text-to-speech synthesis apparatus and receive synthesized speech data (e.g., speech data "How are you" reflecting the articulatory feature of "Person 1") from the text-to-speech synthesis apparatus. The text-to-speech synthesis apparatus will be described in detail below with reference to FIG. 2. The text-to-speech synthesis terminal 100 may output the synthesized speech data to the user 110. Unlike this, the text-to-speech synthesis terminal 100 may include the text-to-speech synthesis apparatus.

Figure 2:
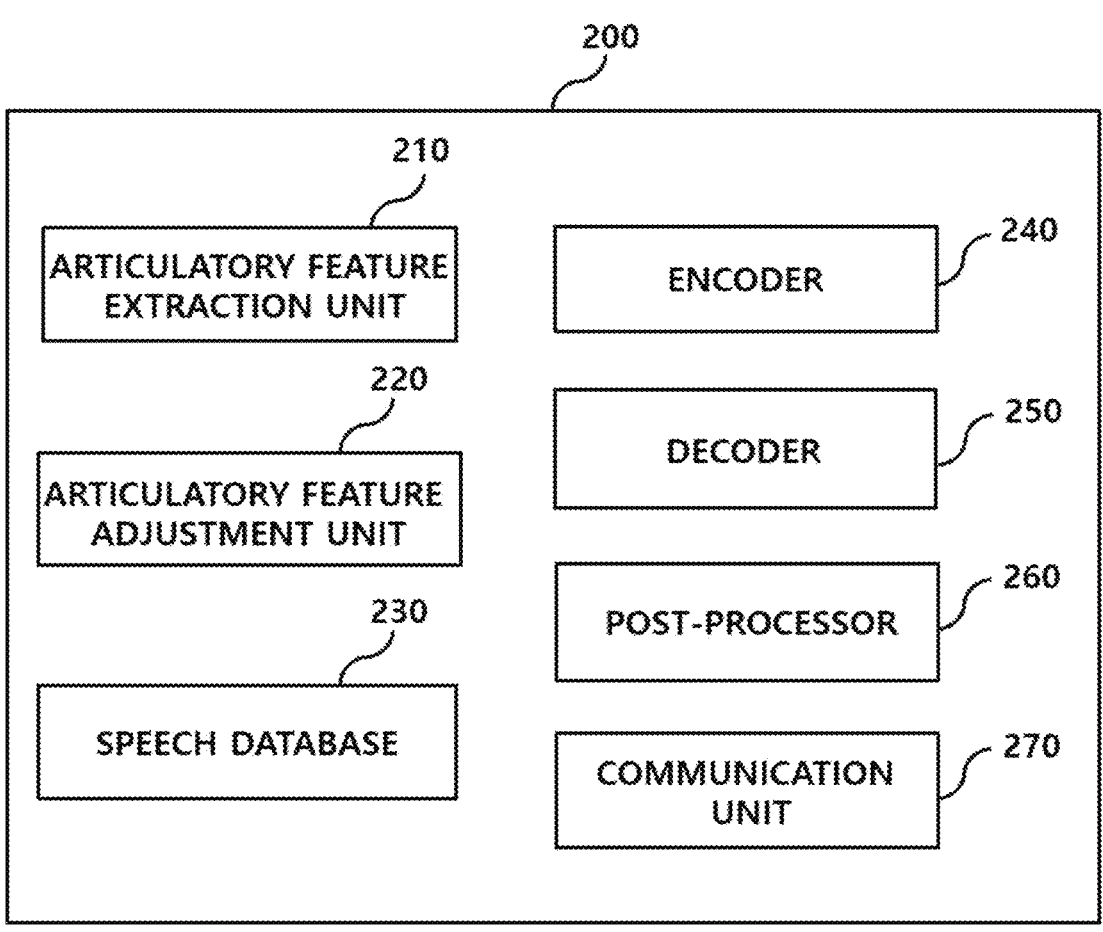
FIG. 2 is a diagram showing a text-to-speech synthesis apparatus according to an embodiment of the present disclosure.

FIG. 2 is a diagram showing a text-to-speech synthesis apparatus 200 according to an embodiment of the present disclosure.

A data learning unit (not shown) and a data recognition unit (not shown) used by the text-to-speech synthesis apparatus 200 of FIG. 2 may include the same or similar elements as a text-to-speech synthesis system 1100 of FIG. 11 to be described below. The text-to-speech synthesis apparatus 200 may include an articulatory feature extraction unit 210, an articulatory feature adjustment unit 220, a speech database 230, an encoder 240, a decoder 250, a post-processor 260, and a communication unit 270.

According to an embodiment, the articulatory feature extraction unit 210 may be configured to receive a speech signal (e.g., a speech sample) of a speaker and extract an articulatory feature of the speaker from the received speech signal. Here, the received speech signal or sample may include speech spectrum data indicative of information associated with the articulatory feature of the speaker. When the articulatory feature of the speaker is extracted, any known appropriate feature extraction method capable of extracting an articulatory feature from the speech signal of the speaker may be used. For example, the articulatory feature may be extracted from the received speech signal or sample using a speech processing method such as Mel-frequency cepstral (MFC). Unlike this, the articulatory feature may be extracted by inputting the speech sample to a learned articulatory feature extraction model (e.g., an artificial neural network). For example, the extracted articulatory feature of the speaker may be represented by an embedding vector. According to another embodiment, the articulatory feature extraction unit 210 may be configured to receive at least one of a text and a video and extract an articulatory feature of the speaker from the received text and video. The extracted articulatory feature of the speaker may be provided to at least one of the encoder 240 or the decoder 250.

According to an embodiment, the articulatory feature of the speaker extracted from the articulatory feature extraction unit 210 may be stored in a storage medium (e.g., the speech database 230) or an external storage device. Thus, when a speech is synthesized from an input text, articulatory features of one or more speakers may be selected or designated from among articulatory features of a plurality of speakers prestored in a storage medium, and the selected or designated articulatory features of the plurality of speakers may be used for speech synthesis.

The articulatory feature adjustment unit 220 may be configured to adjust the articulatory feature of the speaker. According to an embodiment, the articulatory feature adjustment unit 220 may receive information for adjusting the articulatory feature of the speaker. For example, the information for adjusting the articulatory feature of the speaker may be received from a user by the articulatory feature adjustment unit 220. Based on the information received from the user, the articulatory feature adjustment unit 220 may adjust the articulatory feature of the speaker extracted from the articulatory feature extraction unit 210.

According to an embodiment, the speech database 230 may store a learning text and a speech corresponding to a plurality of learning texts. The learning text may be written with at least one language and may include at least one of a word, a phrase, and a sentence that are understandable by people. Also, the speech stored in the speech database 230 may include speech data obtained by a plurality of speakers reading the learning text. The learning text and the speech data may be prestored in the speech database 230 or received from the communication unit 270. At least one of the encoder 240 and the decoder 250 may include or generate a single artificial neural network text-to-speech synthesis model based on the learning text and speech stored in the speech database 230. For example, the encoder 240 and decoder 250 may constitute the single artificial neural network text-to-synthesis model.

According to an embodiment, the speech database 230 may be configured to store articulatory features of one or more speakers extracted from the articulatory feature extraction unit 210. The stored articulatory feature of the speaker (e.g., an embedding vector indicative of the articulatory feature of the speaker) may be provided to at least one of the encoder 240 or the decoder 250 upon the speech synthesis.

Also, the encoder 240 may receive an input text and convert the input text into a character embedding to be generated. The character embedding may be input to the single artificial neural network text-to-speech synthesis model (e.g., pre-net, CBHG module, DNN, CNN+DNN, etc.) to generate hidden states of the encoder 240. According to an embodiment, the encoder 240 may further receive an articulatory feature of a speaker from at least one of the articulatory feature extraction unit 210 and the articulatory feature adjustment unit 220 and may input the character embedding and the articulatory feature of the speaker to the single artificial neural network text-to-speech synthesis model (e.g., pre-net, CBHG module, DNN, CNN+DNN, etc.) to generate the hidden states of the encoder 240. The hidden states of the encoder 240 generated in this way may be provided to the decoder 250.

The decoder 250 may be configured to receive an articulatory feature of a speaker. The decoder 250 may receive the articulatory feature of the speaker from at least one of the articulatory feature extraction unit 210 and the articulatory feature adjustment unit 220. However, the present invention is not limited thereto, and the decoder 250 may receive the articulatory feature of the speaker from the communication unit 270 or an input/output (I/O) unit (not shown).

The decoder 250 may receive hidden states corresponding to the input text from the encoder 240. According to an embodiment, the decoder 250 may include an attention module configured to determine from which portion of the input text a speech is to be generated at the current time-step.

The decoder 250 may input the articulatory feature of the speaker and an input text to the single artificial neural network text-to-speech synthesis model to generate output speech data corresponding to the input text. The output speech data may include synthesized speech data reflecting the articulatory feature of the speaker. According to an embodiment, output speech data indicative of that a predetermined first speaker has read the input text may be generated based on an articulatory feature of the first speaker. For example, the output speech data may be expressed as a mel-spectrogram. However, the present invention is not limited thereto, and the output speech data may be expressed as a linear spectrogram. The output speech data may be output to at least one of a loudspeaker, the post-processor 260, or the communication unit 270.

According to an embodiment, the post-processor 260 may be configured to convert the output speech data generated in the decoder 250 into a speech that can be output from the loudspeaker. For example, the converted speech may be expressed as a waveform. The post-processor 260 may be configured to operate only when it is inappropriate for the output speech data generated in the decoder 250 to be output from the loudspeaker. That is, when it is appropriate for the output speech data generated in the decoder 250 to be output from the loudspeaker, the output speech data may be output to the loudspeaker directly but not via the post-processor 260. Thus, in FIG. 2, the post-processor 260 is shown as being included in the text-to-speech synthesis apparatus 200. However, the post-processor 260 may not be included in the text-to-speech synthesis apparatus 200.

According to an embodiment, the post-processor 260 may be configured to convert the output speech data expressed by a mel-spectrogram generated in the decoder 250 into a waveform in the time domain. Also, when the signal size of the output speech data does not reach a predetermined reference size, the post-processor 260 may amplify the output speech data. The post-processor 260 may output the converted output speech data to at least one of the loudspeaker or the communication unit 270.

The communication unit 270 may be configured for the text-to-speech synthesis apparatus 200 to transmit or receive signals or data to or from an external apparatus. The external apparatus may include the text-to-speech synthesis terminal 100 of FIG. 1. Unlike this, the external apparatus may include another text-to-speech synthesis apparatus. Alternatively, the external apparatus may be any apparatus including a speech database.

According to an embodiment, the communication unit 270 may be configured to receive texts from the external apparatus. Here, the text may include a learning text to be used to learn a single artificial neural network text-to-speech synthesis model. Unlike this, the text may include an input text received from a user terminal. The text may be provided to at least one of the encoder 240 or the decoder 250.

In an embodiment, the communication unit 270 may receive an articulatory feature of a speaker from an external apparatus. The communication unit 270 may receive a speech signal or sample of the speaker from the external apparatus and transmit the speech signal or sample to the articulatory feature extraction unit 210.

The communication unit 270 may receive input information from the user terminal. For example, the communication unit 270 may receive input information for adjusting the speaker's articulatory feature and may provide the received input information to the articulatory feature adjustment unit 220.

The communication unit 270 may transmit any signal or data to the external apparatus. For example, the communication unit 270 may transmit information associated with a generated output speech, that is, output speech data to the external apparatus. Also, the generated single artificial neural network text-to-speech synthesis model may be transmitted to the text-to-speech synthesis terminal 100 or another text-to-speech synthesis apparatus through the communication unit 270.

According to an embodiment, the text-to-speech synthesis apparatus 200 may further include an I/O unit (an I/O device; not shown). The I/O unit may directly receive an input from a user. Also, the I/O unit may output at least one of a voice, an image, or a text.

Figure 3:
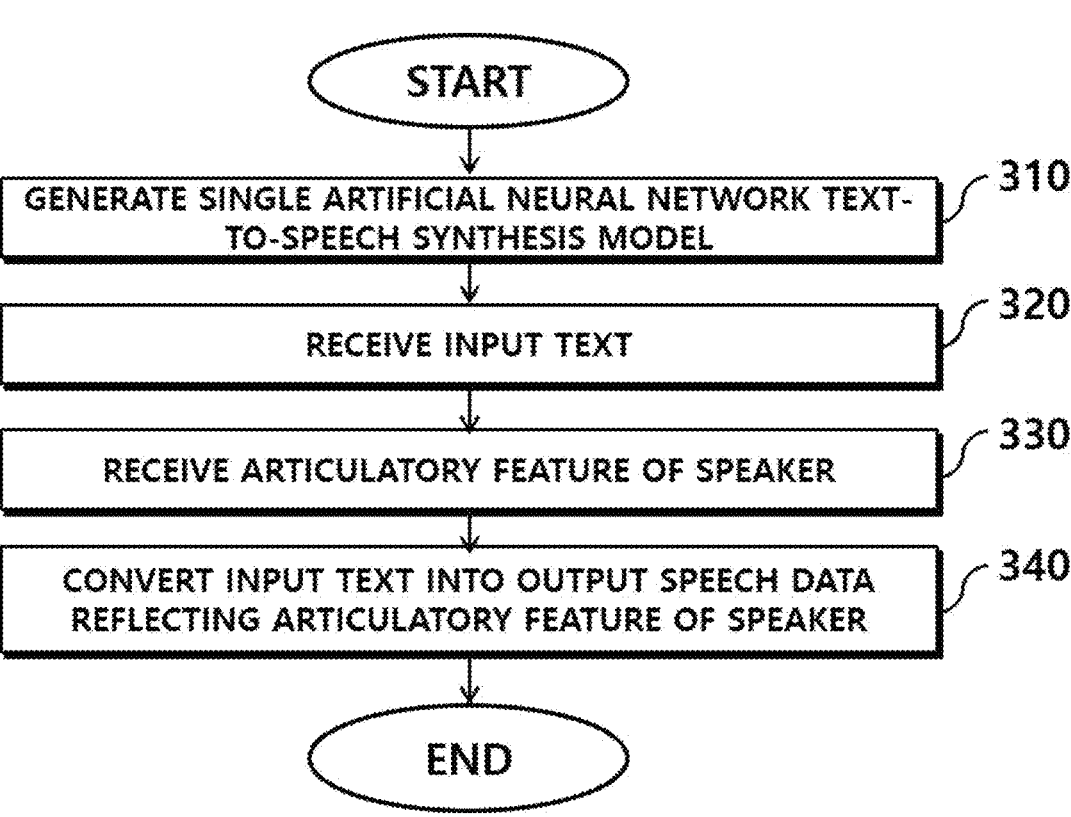
FIG. 3 is a flowchart showing a text-to-speech synthesis method according to an embodiment of the present disclosure.

FIG. 3 is a flowchart showing a text-to-speech synthesis method according to an embodiment of the present disclosure.

First, in operation 310, the text-to-speech synthesis apparatus 200 may perform an operation of performing machine learning based on a plurality of learning texts and speech data corresponding to the plurality of learning texts to generate a single artificial neural network text-to-speech synthesis model. In operation 320, the text-to-speech synthesis apparatus 200 may perform an operation of receiving an input text. In operation 330, the text-to-speech synthesis apparatus 200 may perform an operation of receiving an articulatory feature of a speaker. In operation 340, the text-to-speech synthesis apparatus 200 may perform an operation of inputting the articulatory feature of the speaker to a pre-learned text-to-speech synthesis model to generate output speech data for the input text reflecting the articulatory feature of the speaker.

The text-to-speech synthesis method will be described in detail below in conjunction with FIG. 4.

Figure 4:
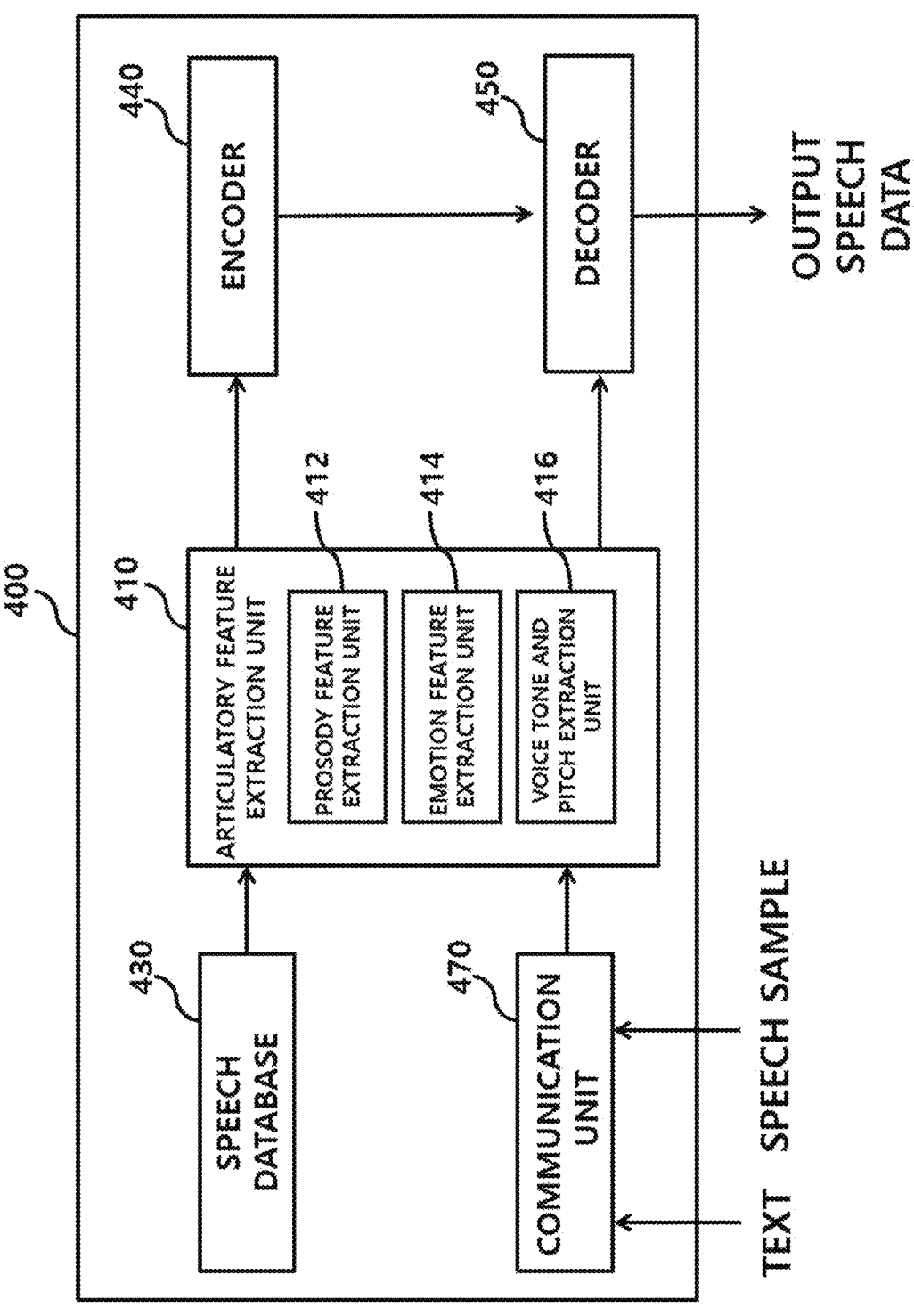
FIG. 4 is a diagram showing a text-to-speech synthesis apparatus according to an embodiment of the present disclosure.

FIG. 4 is a diagram showing a text-to-speech synthesis apparatus 400 according to an embodiment of the present disclosure. The text-to-speech synthesis apparatus 400 of FIG. 4 may include the same or similar elements as the text-to-speech synthesis apparatus 200 of FIG. 2. The text-to-speech synthesis apparatus 400 may include an articulatory feature extraction unit 410, a speech database 430, a communication unit 470, an encoder 440, and a decoder 450. The articulatory feature extraction unit 410 of FIG. 4 may include the same or similar elements as the articulatory feature extraction unit 210 of FIG. 2. The speech database 430 of FIG. 4 may include the same or similar elements as the speech database 230 of FIG. 2. The communication unit 470 of FIG. 4 may include the same or similar elements as the communication unit 270 of FIG. 2. The encoder 440 of FIG. 4 may include the same or similar elements as the encoder 240 of FIG. 2. The decoder 450 of FIG. 4 may include the same or similar elements as the decoder 250 of FIG. 2. Redundant description of the text-to-speech synthesis apparatus 200 of FIG. 2 will be omitted in the description of the text-to-speech synthesis apparatus 400 of FIG. 4.

According to an embodiment, the text-to-speech synthesis apparatus 400 may receive a speech sample or signal of a speaker. For example, the speech sample may be received from a user terminal through the communication unit 470. As another example, the speech sample or signal of the speaker may be received from a text-to-speech synthesis terminal including a speech database. The speech sample or signal of the speaker may be provided to the articulatory feature extraction unit 410. The speech sample or signal of the speaker may include speech data input from the speaker within a predetermined time period. For example, the predetermined time period may represent a relatively short time (e.g., within several seconds, tens of seconds, or tens of minutes) during which the speaker can input his or her speech.

According to an embodiment, the text-to-speech synthesis apparatus 400 may be configured to transmit an input text from which a speech is synthesized. For example, the input text may be received from a user terminal through the communication unit 470. Unlike this, the text-to-speech synthesis apparatus 400 may include an I/O device (not shown) and may receive such an input text. The received input text may be provided to the articulatory feature extraction unit 410.

According to an embodiment, the speech database 430 may be configured to store speech samples or signals of one or more speakers. The speech samples or signals of the speakers may be provided to the articulatory feature extraction unit 410.

The articulatory feature extraction unit 410 may perform an operation of extracting an embedding vector indicative of an articulatory feature of a speaker from a speech sample or signal. The articulatory feature extraction unit 410 may include a prosody feature extraction unit 412, an emotion feature extraction unit 414, and a voice tone and pitch extraction unit 416. In FIG. 4, the articulatory feature extraction unit 410 is shown as including the prosody feature extraction unit 412, the emotion feature extraction unit 414, and the voice tone and pitch extraction unit 416. Alternatively, the articulatory feature extraction unit 410 may include at least one of the prosody feature extraction unit 412, the emotion feature extraction unit 414, and the voice tone and pitch extraction unit 416.

The prosody feature extraction unit 412 may be configured to extract a first sub-embedding vector indicative of a prosody feature of a speaker. Here, the prosody feature may include at least one of information on utterance speed, information on accentuation, information on pause duration, and information on voice pitch. The first sub-embedding vector indicative of the extracted prosody feature of the speaker may be provided to at least one of the encoder 440 or the decoder 450. According to an embodiment, the encoder 440 and the decoder 450 may input the first sub-embedding vector indicative of the prosody feature to the single artificial neural network text-to-speech synthesis model to generate output speech data for an input text reflecting the prosody feature of the speaker.

The emotion feature extraction unit 414 may be configured to extract a second sub-embedding vector indicative of an emotion feature of a speaker. Here, the emotion feature may include information regarding an emotion implied in what the speaker utters. For example, the emotion feature may not be limited to a predetermined emotion and may include the degrees of one or more emotions implied in the speaker's speech and/or information regarding a combination of the implied emotions. The second sub-embedding vector indicative of the extracted emotion feature of the speaker may be provided to at least one of the encoder 440 or the decoder 450. According to an embodiment, the encoder 440 and the decoder 450 may input the second sub-embedding vector indicative of the emotion feature to the single artificial neural network text-to-speech synthesis model to generate output speech data for an input text reflecting the emotion feature of the speaker.

The voice tone and pitch extraction unit 416 may be configured to extract a third sub-embedding vector indicative of a feature related to a speaker's voice tone and pitch. The third sub-embedding vector indicative of the extracted feature related to the speaker's voice tone and pitch may be provided to at least one of the encoder 440 or the decoder 450. According to an embodiment, the encoder 440 and the decoder 450 may input the third sub-embedding vector indicative of the feature related to the speaker's voice tone and pitch to the single artificial neural network text-to-speech synthesis model to generate output speech data for an input text reflecting the feature related to the speaker's voice tone and pitch.

According to an embodiment, the encoder 440 may receive the embedding vector indicative of the extracted articulatory feature of the speaker. The encoder 440 may synthesize a speech more similar to that of a speaker by generating or updating a single artificial neural network text-to-speech synthesis model based on previously machine-learned embedding vectors indicative of articulatory features of one or more speakers and the received embedding vector indicative of the articulatory feature of the speaker.

In FIG. 4, it is shown that at least one of an emotion feature, a prosody feature, or a voice tone and pitch is extracted from a speech sample or signal of one speaker to synthesize a speech. However, the present invention is not limited thereto. In another embodiment, at least one of the emotion feature, the prosody feature, or the voice tone and pitch may be extracted from a speech sample or signal of another speaker. For example, the articulatory feature extraction unit 410 may receive a speech sample or signal of a first speaker and extract an emotion feature and a prosody feature from the received speech sample or signal of the first speaker. The articulatory feature extraction unit 410 may receive a speech sample or signal of a second speaker (e.g., a celebrity's voice) and extract a voice tone/pitch feature from the received speech sample or signal of the second speaker. The articulatory features of the two speakers extracted in this way may be provided to at least one of the encoder 440 or the decoder 450 upon speech synthesis. Thus, the synthesized speech may reflect the emotion and prosody of the first speaker who utters a speech included in the speech sample or signal of the first speaker and also may reflect the voice tone and pitch of the second speaker who utters a speech included in the speech sample or signal of the second speaker (e.g., a celebrity).

Figure 5:
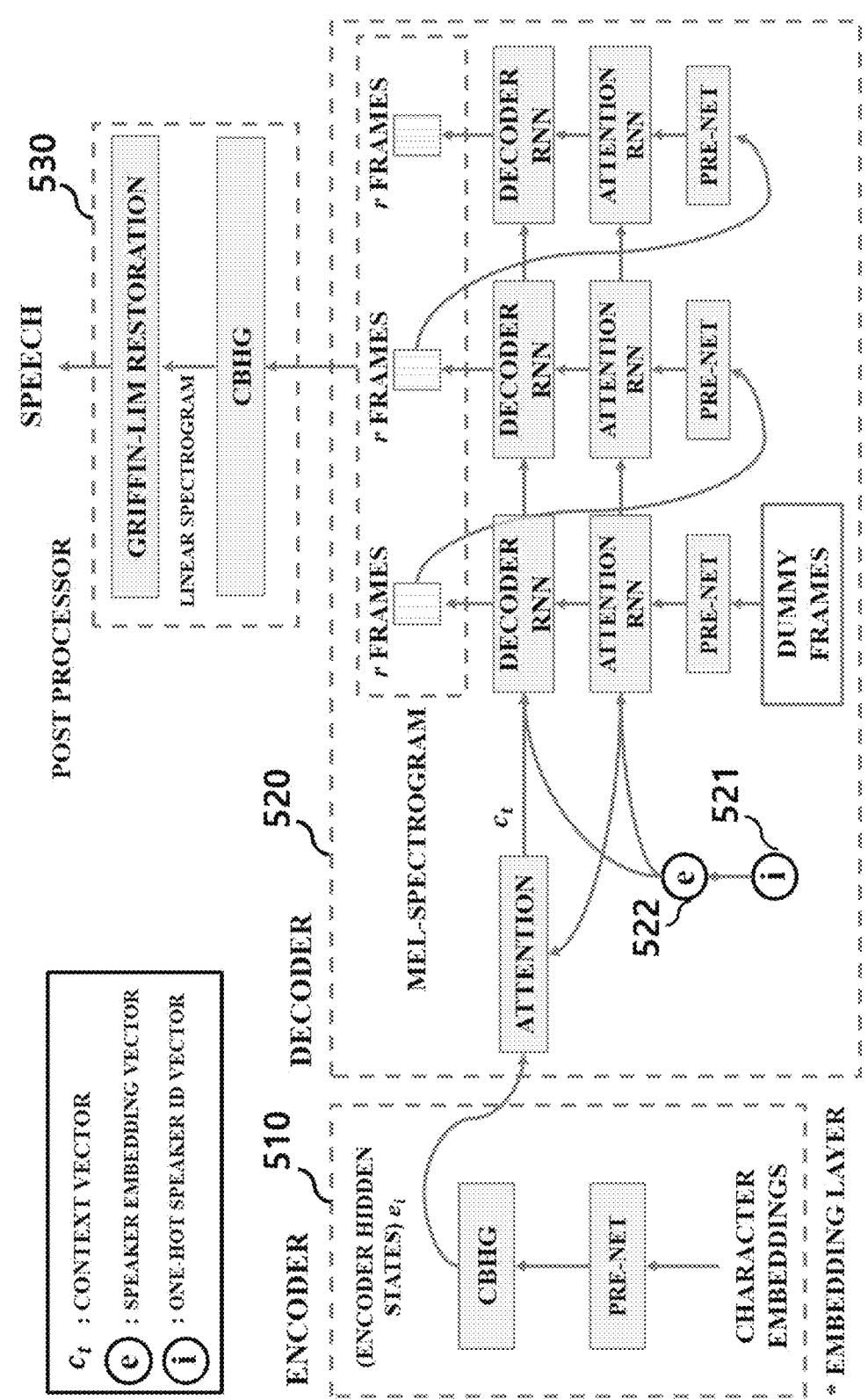
FIG. 5 is a diagram showing a configuration of an artificial neural network-based text-to-speech synthesis apparatus.

FIG. 5 is a diagram showing a configuration of an artificial neural network-based text-to-speech synthesis apparatus.

According to an embodiment, an encoder 510 may be configured to generate a text as pronunciation information. Also, the generated pronunciation information may be provided to a decoder 520 which includes an attention module, and the decoder 520 may be configured to generate a speech using the pronunciation information.

The encoder 510 may perform conversion of an input text to generate a character embedding. In the encoder 510, the generated character embedding may pass through a pre-net including a fully-connected layer. Also, the encoder 510 may provide an output originating from the pre-net to a CBHG module and may output encoder hidden states ei as shown in FIG. 5. For example, the CBHG module may include a one-dimensional (1D) convolution bank, a max pooling, a highway network, and a bidirectional gated recurrent unit (GRU).

The decoder 520 may include an attention recurrent neural network (RNN) that includes a pre-net having a fully-connected layer and a GRU and a decoder RNN that includes a residual GRU. For example, the output from the decoder 520 may be expressed as a mel-scale spectrogram.

The attention RNN and the decoder RNN of the decoder 520 may receive information corresponding to the speaker of the speech. For example, the decoder 520 may receive a one-hot speaker ID vector 521. The decoder 520 may generate a speaker embedding vector 522 based on the one-hot speaker ID vector 521. The attention RNN and the decoder RNN of the decoder 520 may receive the speaker embedding vector 522 and update the single artificial neural network text-to-speech synthesis model such that a different piece of output speech data is generated for each speaker.

Also, like the encoder 510, the decoder 520 may use a database where input texts, speaker-associated information, and speech signals corresponding to the input texts are present in groups to generate or update the single artificial neural network text-to-speech synthesis model. The decoder 520 may perform learning by using the input text and the speaker-associated information as an input of the artificial neural network and also using the speech signal corresponding to the input text as an answer. The decoder 520 may apply the input text and the speaker-associated information to the updated single artificial neural network text-to-speech synthesis model and then output the corresponding speaker's speech.

Also, the output of the decoder 520 may be provided to a post-processor 530. The CBHG of the post-processor 530 may be configured to convert the mel-scale spectrogram of the decoder 520 into a linear-scale spectrogram. For example, the output signal of the CBHG of the post-processor 530 may include a magnitude spectrogram. The phase of the output signal of the CBHG of the post-processor 530 may be restored through a Griffin-Lim algorithm, and an inverse short-time Fourier transform may be performed. The post-processor 530 may output a speech signal in the time domain.

The artificial neural network-based text-to-speech synthesis apparatus may be learned using a large database where texts and speech signals are present in pairs. A loss function may be defined by comparing an output obtained by entering a text as an input to an answer speech signal. The text-to-speech synthesis apparatus may learn the loss function through an error back propagation algorithm and thus finally may obtain a single artificial neural network text-to-speech synthesis model that outputs a desired speech when any text is input.

Figure 6:
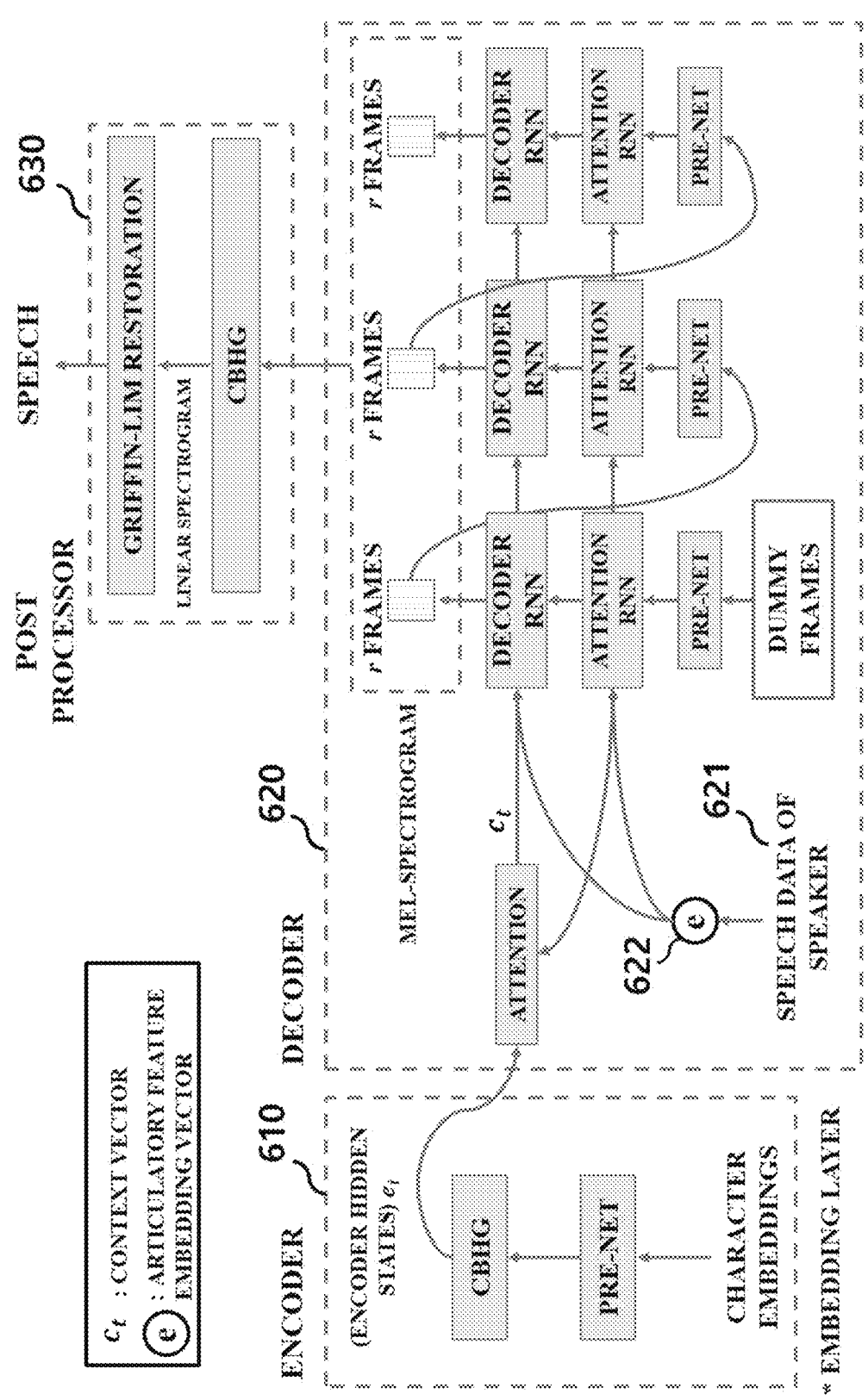
FIG. 6 is a diagram showing a configuration of an artificial neural network-based text-to-speech synthesis apparatus according to an embodiment of the present disclosure.

FIG. 6 is a diagram showing a configuration of an artificial neural network-based text-to-speech synthesis apparatus according to an embodiment of the present disclosure.

In FIG. 6, redundant description with reference to FIG. 5 will be omitted. A decoder 620 of FIG. 6 may receive encoder hidden states ei from an encoder 610. Also, the decoder 620 of FIG. 6 may receive speech data 621 of a speaker, unlike the decoder 520 of FIG. 5. Here, the speech data 621 may include data indicative of a speech input from a speaker within a predetermined time period (a short time period, e.g., several seconds, tens of seconds, or tens of minutes). For example, the speech data 621 of the speaker may include speech spectrogram data (e.g., log-mel-spectrogram). The decoder 620 may acquire an articulatory feature embedding vector 622 of the speaker indicative of an articulatory feature of the speaker based on the speech data of the speaker. The decoder 620 may provide the articulatory feature embedding vector 622 of the speaker to an attention RNN and a decoder RNN.

The text-to-speech synthesis system shown in FIG. 5 may use a speaker ID as information indicative of the articulatory feature of the speaker, and the speaker ID may be represented as a one-hot vector. However, the one-hot speaker ID vector cannot easily expand an ID of a new speaker that does not belong to learning data. Since the text-to-speech synthesis system learns embedding for only a speaker expressed in a one-hot vector, there is no way to obtain the embedding of the new speaker. In order to generate the new speaker's speech, the whole TTS model should be relearned or an embedded layer of the TTS model should be fine-tuned.

When an instrument equipped with a graphics processing unit (GPU) is used, such a task corresponds to a time-consuming process. On the contrary, the text-to-speech synthesis system shown in FIG. 6 provides a TTS system capable of instantly generating a new speaker's speech without manually searching for a speaker embedding vector or additionally learning a TTS model in order to generate a new speaker vector. That is, the text-to-speech synthesis system may generate a speech that is changed adaptively to a plurality of speakers.

According to an embodiment, when speech synthesis is performed on an input text, an articulatory feature embedding vector 622 of a first speaker extracted from speech data 621 of the first speaker may be input to the decoder RNN and the attention RNN as shown in FIG. 6. However, a one-hot speaker ID vector 521 of a second speaker shown in FIG. 5 may also be input to the decoder RNN and the attention RNN. For example, the first speaker associated with the articulatory feature embedding vector 622 may be the same as the second speaker associated with the one-hot speaker ID vector 521. As another example, the first speaker associated with the articulatory feature embedding vector 622 may be different from the second speaker associated with the one-hot speaker ID vector 521. Thus, by inputting the articulatory feature embedding vector 622 of the first speaker and the one-hot speaker ID vector 521 of the second speaker to the decoder RNN and the attention RNN when speech synthesis is performed on an input text, a synthesized speech obtained by reflecting at least one of a prosody feature, an emotion feature, or a voice tone/pitch feature included in the articulatory feature embedding vector 622 of the first speaker in the second speaker's speech corresponding to the input text may be generated. That is, a synthesized speech obtained by reflecting the articulatory feature of the first speaker, that is, the prosody feature, the emotion feature, and the voice tone and pitch feature in the voice of the second speaker associated with the one-hot speaker ID vector 521 may be generated.

Figure 7:
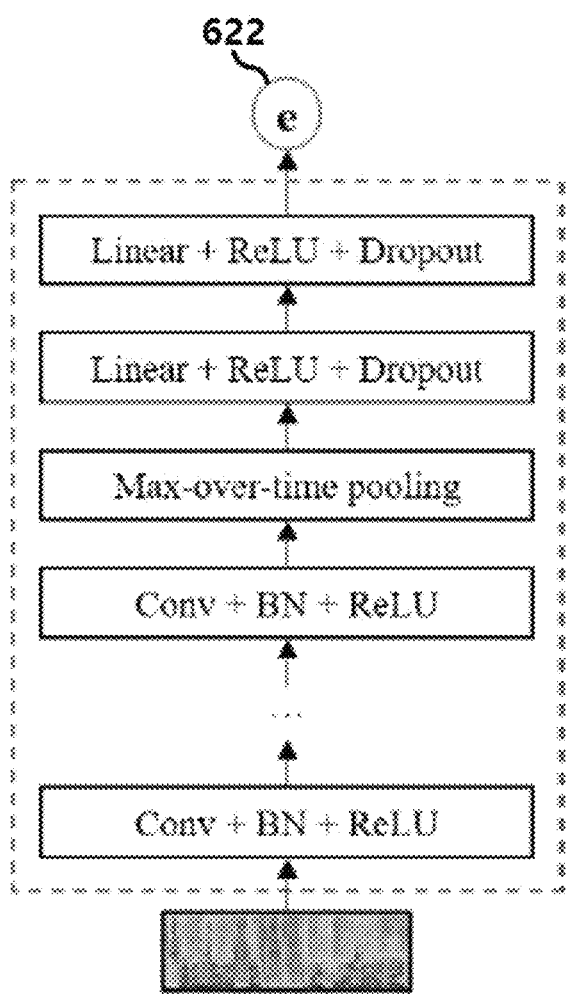
FIG. 7 is a diagram showing a network for extracting the embedding vector capable of distinguishing a plurality of speakers according to an embodiment of the present disclosure.

FIG. 7 is a diagram showing a network for extracting the embedding vector 622 capable of distinguishing a plurality of speakers according to an embodiment of the present disclosure.

According to an embodiment, the network shown in FIG. 6 may include a convolutional network and a max-over-time pooling and may receive a log-Mel-spectrogram and extract a fixed dimension speaker embedding vector as a speech sample or a speech signal. Here, the speech sample or the speech signal need not be speech data corresponding to an input text, and an arbitrarily selected speech signal may be used as the speech sample or the speech signal.

Since such a network has no restriction on the use of spectrograms, any spectrogram may be inserted into the network. Also, thus, an embedding vector 622 indicative of an articulatory feature of a new speaker may be generated through immediate adaptation of the network. An input spectrogram may have various lengths. For example, however, a fixed dimension vector having a length of 1 on a time axis may be input to a max-over-time pooling layer located at one end of a convolution layer.

In FIG. 7, a network including a convolutional network and a max-over-time pooling is shown. However, a network including various layers may be established to extract an articulatory feature of a speaker. For example, when the articulatory feature of the speaker indicates a change in speech feature pattern with time, e.g., intonation, a network may be implemented such that the feature is extracted using an RNN.

Figure 8:
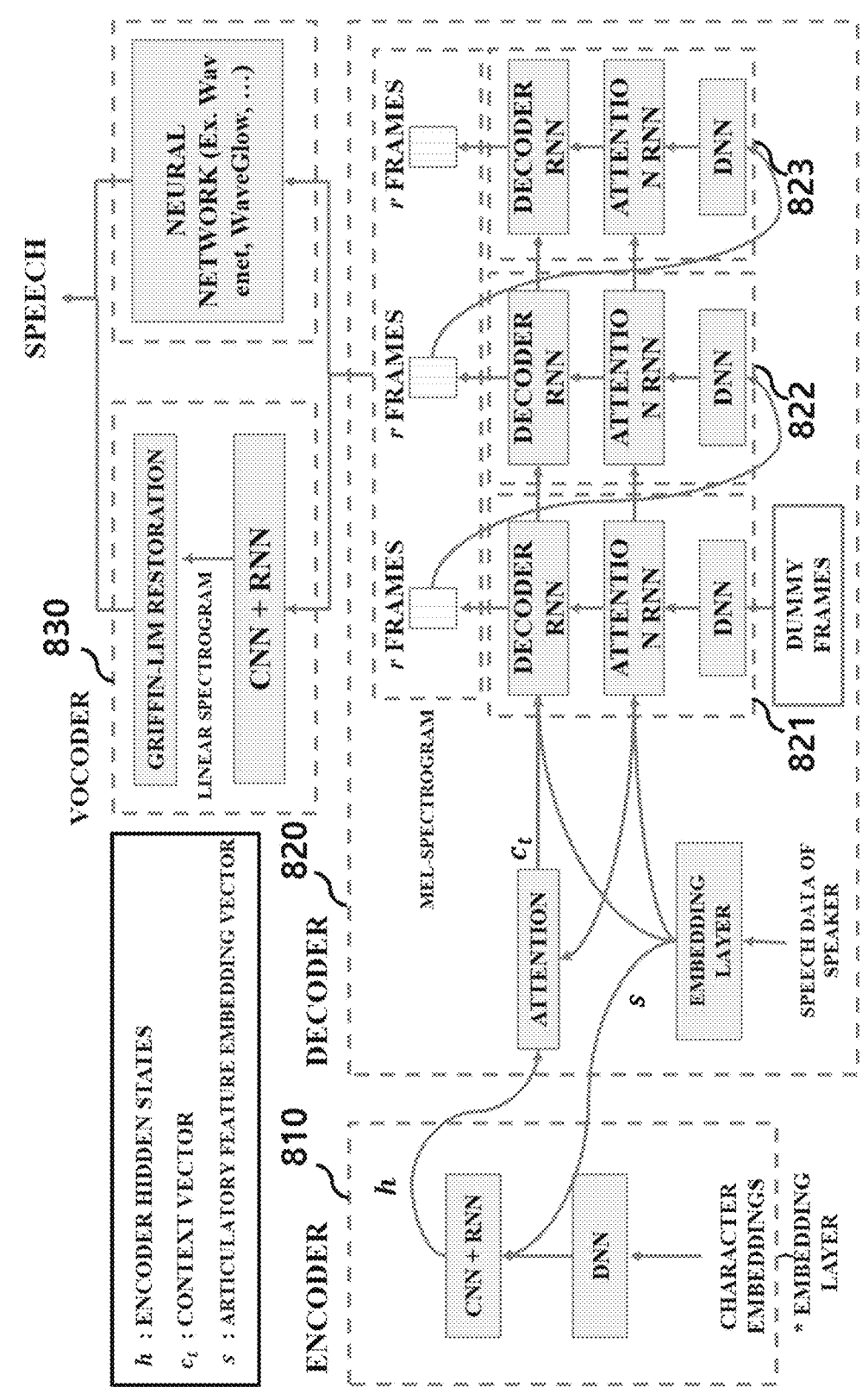
FIG. 8 is a diagram showing a configuration of an artificial neural network-based text-to-speech synthesis apparatus according to an embodiment of the present disclosure.

FIG. 8 is a diagram showing a configuration of an artificial neural network-based text-to-speech synthesis apparatus according to an embodiment of the present disclosure. Redundant description of the text-to-speech synthesis apparatus of FIG. 5 or 6 will be omitted in the following description of the text-to-speech synthesis apparatus of FIG. 8.

Referring to FIG. 8, an encoder 810 may receive an input text. For example, the input text of the encoder 810 may be composed of a plurality of languages. According to an embodiment, the input text may include at least one of words, phrases, or sentences used in one or more languages. For example, a text including a Korean sentence such as " 안녕하세요 " or an English sentence such as "How are you?" may be received. When the input text is received, the encoder 810 may divide the received input text in units of a syllable, a letter, or a phoneme. According to another embodiment, the encoder 810 may receive the input text divided in units of a syllable, a letter, or a phoneme. According to still another embodiment, the encoder 810 may receive a character embedding for the input text.

When the encoder 810 receives the input text or the divided input text, the encoder 810 may be configured to generate at least one embedding layer. According to an embodiment, at least one embedding layer of the encoder 810 may generate a character embedding based on the input text divided in units of a syllable, a letter, or a phoneme. For example, the encoder 810 may use a previously learned machine learning model (e.g., probabilistic models or artificial neural networks) in order to acquire the character embedding based on the divided input text. Further, the encoder 810 may update the machine learning model by performing machine learning. When the machine learning model is updated, the character embedding for the divided input text may also be changed.

The encoder 810 may pass the character embedding to a deep neural network (DNN) module including a fully-connected layer. The DNN may include a general feedforward layer or linear layer.

The encoder 810 may provide the output of the DNN to a module including at least one of a convolutional neural network (CNN) or an RNN. Also, the encoder 810 may receive an articulatory feature embedding vector s of a speaker which is generated in a decoder 820 based on speaker speech data. The CNN may capture a regional feature according to the size of a convolution kernel, whereas the RNN may capture long term dependency. The encoder 810 may input the output of the DNN and the articulatory feature embedding vector s of the speaker to at least one of the CNN or the RNN and may output hidden states h of the encoder 810.

The decoder 820 may receive speech data of the speaker. The decoder 820 may generate the articulatory feature embedding vector s of the speaker based on the speech data of the speaker. The embedding layer may receive the speech data of the speaker. The embedding layer may generate an articulatory feature of the speaker based on the speech data of the speaker. Here, the articulatory feature of the speaker may be different for each individual. The embedding layer may distinguish the articulatory features of the speakers based on, for example, machine learning. For example, the embedding layer may generate the articulatory feature embedding vector s of the speaker indicative of the articulatory feature of the speaker. According to an embodiment, the decoder 820 may use a pre-learned machine learning model in order to convert the articulatory feature of the speaker into the articulatory feature embedding vector s of the speaker. The decoder may update a machine learning model by performing machine learning. When the machine learning model is updated, the articulatory feature embedding vector s of the speaker indicative of the articulatory feature of the speaker may also be changed. For example, the articulatory feature of the speaker may be extracted from the speech data of the speaker received using the above-described speech extraction network of FIG. 7.

The articulatory feature embedding vector s of the speaker may be output to at least one of the CNN or the RNN of the encoder 810. Also, the articulatory feature embedding vector s of the speaker may be output to the decoder RNN and the attention RNN of the decoder.

The attention of the decoder 820 may receive encoder hidden states h from the encoder 810. The hidden states h may represent a result value obtained from a machine learning model of the encoder 810. For example, the hidden states h may include some elements of the single artificial neural network text-to-speech synthesis model according to an embodiment of the present disclosure. Also, the attention of the decoder 820 may receive information from the attention RNN. The information received from the attention RNN may include information regarding which speeches the decoder 820 has generated up to the previous time-step. Also, the attention of the decoder 820 may output a context vector based on information of the encoder and the information received from the attention RNN. The information of the encoder 810 may include information regarding an input text from which a speech is to be generated. The context vector may include information for determining from which part of the input text a speech should be generated at the current time-step. For example, the attention of the decoder 820 may output information for generating a speech based on the front portion of the input text at the beginning of the speech generation and generating a speech based on the rear portion of the input text as the speech is being generated.

The decoder 820 may configure the structure of the artificial neural network such that decoding is performed differently depending on the speaker by inputting the articulatory feature embedding vector s of the speaker to the attention RNN and the decoder RNN. According to an embodiment, the text-to-speech synthesis system may use a database where texts, articulatory feature embedding vectors s of the speakers, and speech signals are present in groups in order to learn an artificial neural network. In another embodiment, as shown in FIG. 5, the database may be built using a one-hot vector instead of the articulatory feature embedding vector s of the speaker indicative of the articulatory feature of the speaker. Alternatively, both of the articulatory feature embedding vector s of the speaker and a one-hot vector may be used to build the database.

Dummy frames are frames to be input to a decoder when the previous time-step is not present. The RNN may perform machine learning through autoregression. That is, r frames that are output at a previous time-step 822 may be inputs at a current time-step 823. Since there is no previous time-step at an initial time-step 821, the decoder 820 may input a dummy frame to a machine learning network at the initial time-step.

According to an embodiment, the decoder 820 may include a DNN including a fully-connected layer. The DNN may include at least one of a general feedforward layer or a linear layer.

In an embodiment, the decoder 820 may include an attention RNN including a GRU. The attention RNN is a layer that outputs information to be used in the attention. The attention has been described above, and thus a detailed description thereof will be omitted.

The decoder 820 may include a decoder RNN including a residual GRU. The decoder RNN may receive position information of the input text from the attention. That is, the position information may include information regarding which position in the input text the decoder 820 is converting into a speech. The decoder RNN may receive information from the attention RNN. The information received from the attention RNN may include information regarding which speeches the decoder 820 has generated up to the previous time-step. The decoder RNN may generate the next output speech following the output speeches that have been generated so far. For example, the output speech may have a mel-spectrogram form, and the output speech may include r frames.

For the purpose of text-to-speech synthesis, the operations of the DNN, the attention RNN, and the decoder RNN may be repeatedly performed. For example, r frames acquired at the initial time-step 821 may be inputs for the next time-step 822. Also, the r frames output at the time-step 822 may be inputs for the next time-step 823.

Through the above-described process, a speech may be generated for each unit of the text. According to an embodiment, the text-to-speech synthesis system may acquire a speech of a mel-spectrogram for the whole text by concatenating mel-spectrograms for the time-steps in chronological order. The speech of the mel-spectrogram for the whole text may be output to a vocoder 830.

The CNN or RNN of the vocoder 830 according to an embodiment of the present disclosure may perform similar operations to the CNN or RNN of the encoder 810. That is, the CNN or RNN of the vocoder 830 may capture a regional feature and long term dependency. Thus, the CNN or RNN of the vocoder 830 may output a linear-scale spectrogram. For example, the linear-scale spectrogram may include a magnitude spectrogram. As shown in FIG. 8, the vocoder 830 may predict the phase of the spectrogram through a Griffin-Lim algorithm. The vocoder 830 may output a speech signal in the time domain by using an inverse short-time Fourier transform.

A vocoder according to another embodiment of the present disclosure may generate a speech signal from the mel-spectrogram based on a machine learning model. The machine learning model may include a model that machine-learns a correlation between the mel-spectrogram and the speech signal. For example, an artificial neural network model such as WaveNet or WaveGlow may be used.

The artificial neural network-based speech synthesis apparatus may be learned using a large database where speech signals and texts including one or more languages are present in pairs. According to an embodiment, the speech synthesis apparatus may receive a text, compare the output speech signal to an answer speech signal, and define a loss function. The speech synthesis apparatus may learn the loss function through an error back-propagation algorithm and thus finally may obtain an artificial neural network that outputs a desired speech when any text is input.

In such an artificial neural network-based speech synthesis apparatus, a speech signal may be output by inputting a text, an articulatory feature of a speaker, or the like to the artificial neural network. By performing learning by comparing the output speech signal to an answer speech signal, the text-to-speech synthesis apparatus may generate output speech data for reading the text with the speaker's voice when the text and the articulatory feature of the speaker are received.

Figure 9:
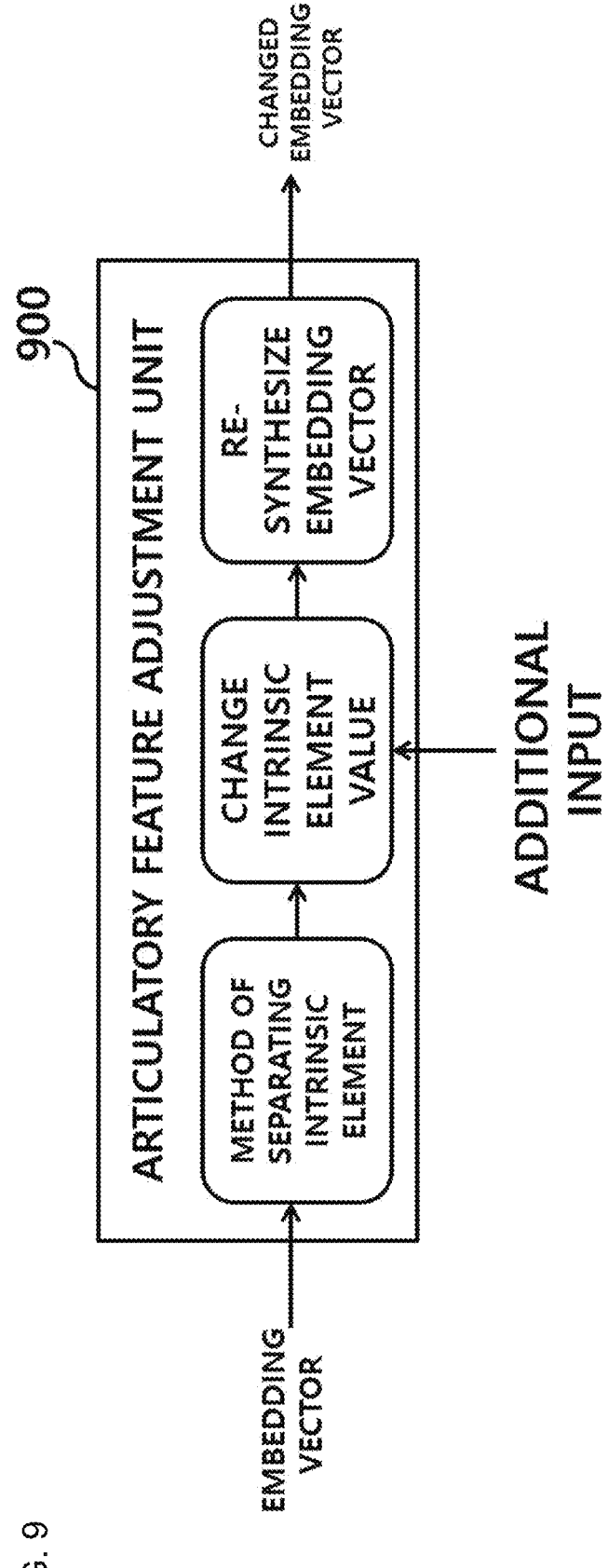
FIG. 9 is a flowchart showing operation of an articulatory feature adjustment unit according to an embodiment of the present disclosure.

FIG. 9 is a flowchart showing operation of an articulatory feature adjustment unit 900 according to an embodiment of the present disclosure.

The articulatory feature adjustment unit 900 of FIG. 8 may have the same or similar elements as the articulatory feature adjustment unit 220 of FIG. 2. Redundant description with reference to FIG. 2 will be omitted.

The articulatory feature adjustment unit 900 may receive an embedding vector indicative of speaker information. According to an embodiment, the embedding vector may include an embedding vector for an articulatory feature of a speaker. For example, the embedding vector for the speaker information may be represented as a weighted sum of a plurality of sub-embedding vectors orthogonal to one another, which are included in the articulatory feature of the speaker.

The articulatory feature adjustment unit 900 may separate an intrinsic element of the received embedding vector for the speaker information. For example, the articulatory feature adjustment unit 900 may acquire a plurality of unit embedding vectors orthogonal to one another based on the embedding vector for the speaker information. According to an embodiment, the method of separating an intrinsic element of the embedding vector may include various methods such as independent component analysis (ICA), independent vector analysis (IVA), sparse coding, independent factor analysis (IFA), independent subspace analysis (ISA), nonnegative matrix factorization (NMF), and the like. Also, when the text-to-speech synthesis apparatus learns the embedding vector for the speaker information, the text-to-speech synthesis apparatus may perform regularization on a learning equation of the text-to-speech synthesis apparatus so that intrinsic elements embedded in the embedding vector can be separated. When the text-to-speech synthesis apparatus performs normalization on the learning equation and then performs machine learning, the embedding vector may be learned using a sparse vector. Thus, the text-to-speech synthesis apparatus may accurately separate an intrinsic element from the embedding vector learned with the sparse vector by means of principal component analysis (PCA).

According to an embodiment, the articulatory feature adjustment unit 900 may be configured to receive an additional input for the output speech data. The articulatory feature adjustment unit 900 may modify the embedding vector indicative of the articulatory feature of the speaker based on the additional input. For example, the articulatory feature adjustment unit 900 may change weights of the plurality of unit embedding vectors based on the additional input.

In an embodiment, the articulatory feature adjustment unit 900 may be configured to modify the embedding vector indicative of the articulatory feature of the speaker based on the received additional input. For example, the articulatory feature adjustment unit 900 may re-synthesize the embedding vector for the speaker information by multiplying the plurality of unit embedding vectors by the weights changed according to the additional input and then performing addition thereof. The articulatory feature adjustment unit 900 may output an embedding vector for the changed speaker information. The text-to-speech synthesis apparatus may input the modified embedding vector to a single artificial neural network text-to-speech synthesis model and convert the output speech data into speech data for the input text reflecting information included in the additional input.

Figure 10:
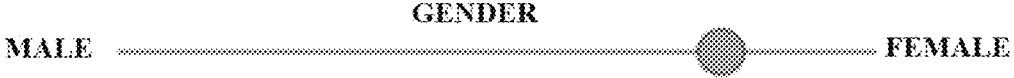
FIG. 10 shows an example of a user interface for changing the feature of an output speech according to an embodiment of the present disclosure.
Figure 10:
Figure 10:
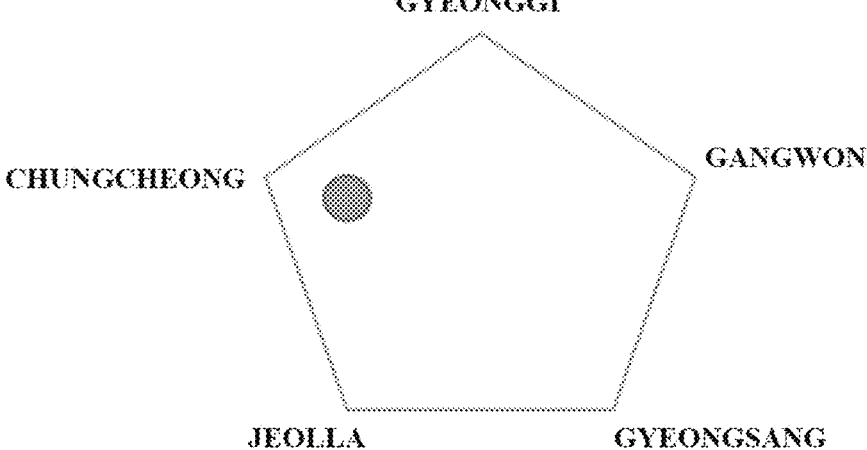

FIG. 10 shows an example of a user interface for changing the feature of an output speech according to an embodiment of the present disclosure.

The text-to-speech synthesis apparatus may receive a text input to a text window from a user. When a play button shown in FIG. 10 is selected (e.g., when the button is touched or pressed), the text-to-speech synthesis apparatus may generate the output speech data corresponding to the input text and provide the generated output speech data to a user terminal including a user interface.

The text-to-speech synthesis apparatus may receive an additional input from the user. The additional input for the output speech data may include at least one of gender information, age information, regional accent information, articulation speed information, voice pitch information, or articulation level information.

According to an embodiment, the text-to-speech synthesis apparatus may transmit an articulatory feature of a speaker who is currently selected or a previously designated to a user terminal through a communication unit, and current speech features may be displayed in a predetermined shape (e.g., a line, a polygon, a circle, or the like) on a display unit of the user terminal. The user may change at least one of the gender information, the age information, the regional accent information, the articulation speed information, the voice pitch, or articulation level information by means of an input unit, and the changed output speech may be output based on the user's input. For example, as shown in FIG. 9, the user may select a gender close to women, an age closer to 10s than to 60*s*, and an accent of Chungcheong Province in South Korea. The current feature of the speech may be changed according to the selected input, and a speech that reflects or synthesized from the changed feature of the speech may be output to the user terminal.

The configurations for changing vocal features by changing one or more of the intrinsic elements among the embedding vectors for the speaker information according to several embodiments have been described above, but the present invention is not limited thereto. The configurations may be made according to another appropriate scheme. According to an embodiment, an intrinsic element of the embedding vector may be expressed as and changed to an attribute of a speech synthesis markup language (SSML). For example, the intrinsic element may be expressed as the attribute of the SSML such as <gender value="6"><region value="3,4,5">.

Figure 11:
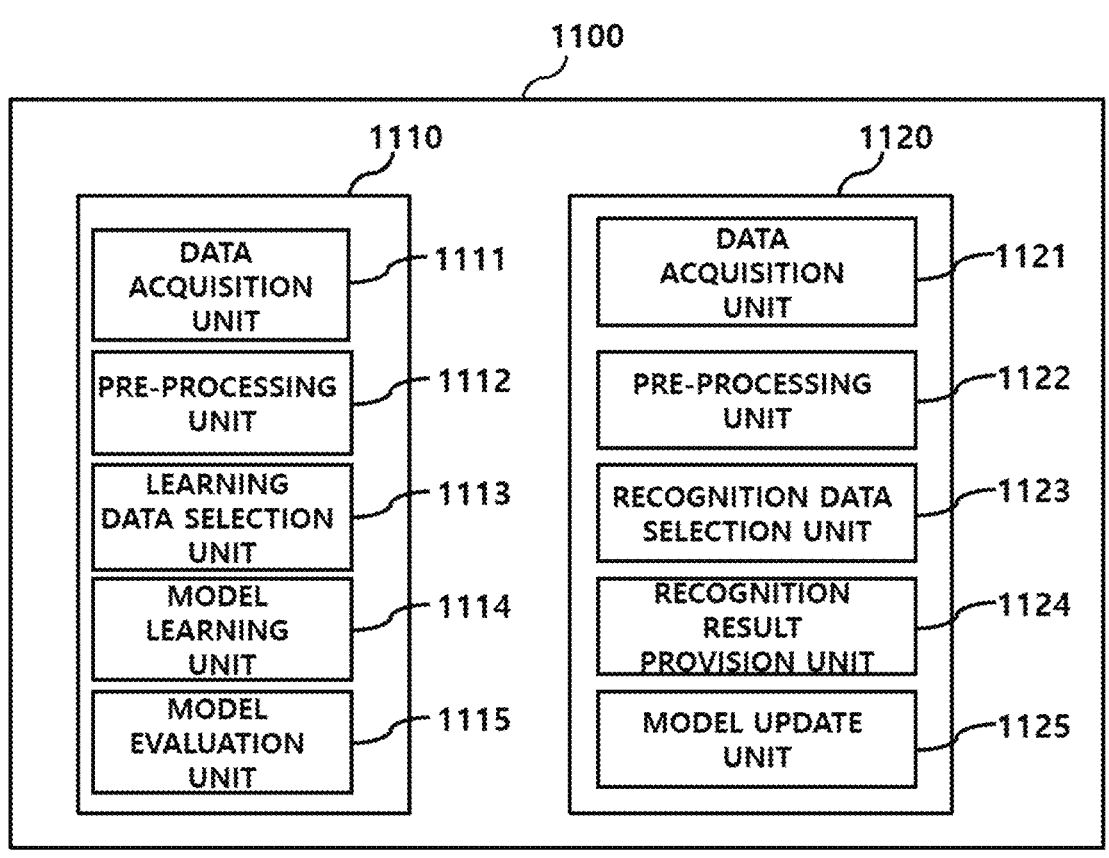
FIG. 11 is a block diagram of a text-to-speech synthesis system according to an embodiment of the present disclosure.

FIG. 11 is a block diagram of a text-to-speech synthesis system 1100 according to an embodiment of the present disclosure.

Referring to FIG. 11, the text-to-speech synthesis system 1100 according to an embodiment may include a data learning unit 1110 and a data recognition unit 1120. The data learning unit 1110 may input data and acquire a machine learning model. Also, the data recognition unit 1120 may generate an output speech by applying the data to the machine learning model. The text-to-speech synthesis system 1100 may include a processor and a memory.

The data learning unit 1110 may learn a speech for a text. The data learning unit 1110 may learn a criterion on which speech is to be output according to the text. Also, the data learning unit 1110 may learn a criterion on which speech feature is to be used to output the speech. The speech feature may include at least one of a phoneme pronunciation and a user's tone, intonation, or accent. The data learning unit 1110 may learn a speech for a text by acquiring data to be used for the learning and by applying the acquired data to a data learning model to be described below.

The data recognition unit 1120 may output a speech for a text based on the text. The data recognition unit 1120 may output a speech from a predetermined text using the learned data learning model. The data recognition unit 1120 may acquire a predetermined text (data) according to a predetermined criterion by the learning. Also, the data recognition unit 1120 may output a speech based on the predetermined data by setting the acquired data as an input value and using the data learning model. Also, a result value that is output by the data learning model using the acquired data as an input value may be used to update the data learning model.

At least one of the data learning unit 1110 or the data recognition unit 1120 may be manufactured in the form of at least one hardware chip and mounted on an electronic apparatus. For example, at least one of the data learning unit 1110 or the data recognition unit 1120 may be manufactured in the form of an artificial intelligence (AI)-dedicated hardware chip or a portion of a conventional general-purpose processor (e.g., a CPU or an application processor) or a graphics processor (e.g., a GPU) and thus may be mounted on various electronic apparatuses that have been described above.

Also, the data learning unit 1110 and the data recognition unit 1120 may be mounted on separate electronic apparatuses. For example, one of the data learning unit 1110 and the data recognition unit 1120 may be included in an electronic apparatus, and the other may be included in a server. Also, the following operations may be performed between the data learning unit 1110 and the data recognition unit 1120 in a wired or wireless manner. Model information established by the data learning unit 1110 may be provided to the data recognition unit 1120, and data input to the data recognition unit 1120 may be provided to the data learning unit 1110 as additional learning data.

Meanwhile, at least one of the data learning unit 1110 or the data recognition unit 1120 may be implemented as a software module. When at least one of the data learning unit 1110 or the data recognition unit 1120 is implemented as a software module (or a program module including instructions), the software module may be stored in a memory or a non-transitory computer-readable medium. Also, in this case, at least one software module may be provided by an operating system (OS) or may be provided by a predetermined application. Unlike this, some of the at least one software module may be provided by an OS, and the others may be provided by a predetermined application.

The data learning unit 1110 according to an embodiment of the present disclosure may include a data acquisition unit 1111, a pre-processing unit 1112, a learning data selection unit 1113, a model learning unit 1114, and a model evaluation unit 1115.

The data acquisition unit 1111 may acquire data necessary for machine learning. Since much data is needed for the learning, the data acquisition unit 1111 may receive a plurality of texts and speeches corresponding to the texts.

The pre-processing unit 1112 may pre-process the acquired data such that the acquired data can be used for machine learning in order to determine the user's mental state. The pre-processing unit 1112 may process the acquired data in a predetermined format such that the model learning unit 1114 to be described below can use the data. For example, the pre-processing unit 1112 may morphologically analyze a text and a speech to acquire a morpheme embedding.

The learning data selection unit 1113 may select data necessary for learning from the pre-processed data. The selected data may be provided to the model learning unit 1114. The learning data selection unit 1113 may select data necessary for learning from the pre-processed data according to a predetermined criterion. Also, the learning data selection unit 1113 may select data according to the predetermined criterion through learning by the model learning unit 1114 to be described below.

The model learning unit 1114 may learn a criterion on which speech is to be output depending on the text based on the learning data. Also, the model learning unit 1114 may perform learning by using a learning model for outputting a speech according to a text as the learning data. In this case, the data learning model may include a pre-established model. For example, the data learning model may include a model pre-built by receiving basic learning data (e.g., a sample image).

The data learning model may be built in consideration of an application of the learning model, a purpose of the learning, computer performance of an apparatus, or the like. The data learning model may include, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), and Convolutional Neural Network (CNN) may be used as the data learning model. However, the present invention is not limited thereto.

According to various embodiments, when a plurality of pre-built data learning models are present, the model learning unit 1114 may determine a data learning model having a large correlation between the input learning data and the basic learning data as a data learning model to be learned. In this case, the basic learning data may be pre-classified for each data type, and the data learning model may be pre-built for each data type. For example, the basic learning data may be pre-classified according to various criteria such as a region where the learning data is generated, a time when the learning data is generated, the size of the learning data, the genre of the learning data, the creator of the learning data, the types of objects in the learning data, and the like.

Also, the model learning unit 1114 may train the data learning model using, for example, a learning algorithm including error back propagation or gradient descent.

Also, the model learning unit 1114 may learn the data learning model through, for example, supervised learning having the learning data as an input value.

Also, by self-learning the type of data necessary for situation determination without any supervision, the model learning unit 1114 may learn the data learning model through, for example, unsupervised learning that finds a criterion for the situation determination. Also, the model learning unit 1114 may learn the data learning model through, for example, reinforcement learning using feedback to whether the result of the situation determination according to the learning is correct.

Also, when the data learning model is learned, the model learning unit 1114 may store the learned data learning model. In this case, the model learning unit 1114 may store the learned data learning model in a memory of an electronic apparatus including the data recognition unit 1120. Alternatively, the model learning unit 1114 may store the learned data learning model in a memory of a server connected to an electronic apparatus over a wired or wireless network.

In this case, for example, instructions or data associated with at least one another element of the electronic apparatus may also be stored in the memory where the learned data learning model is stored. Also, the memory may store software and/or a program. The program may include, for example, a kernel, middleware, an application, an application programming interface (API), and/or an application program (or an "application"), The model evaluation unit 1115 inputs evaluation data to the data learning model. When a result output from the evaluation data does not satisfy a predetermined criterion, the model evaluation unit 1115 may allow the model learning unit 1114 to perform learning again. In this case, the evaluation data may include data predetermined to evaluate the data learning model.

For example, the model evaluation unit 1115 may evaluate that the predetermined criterion is not satisfied when the number or ratio of pieces of the evaluation data which are incorrect for a recognition result with respect to a result of the evaluation data by the learned data learning model exceeds a predetermined threshold. For example, when the predetermined criterion is defined as a ratio of 2% and the learned data learning model outputs incorrect recognition results for more than 20 pieces of evaluation data out of a total of 1000 pieces of evaluation data, the model evaluation unit 1115 may evaluate that the learned data learning model is not appropriate.

Meanwhile, when a plurality of learned data learning models are present, the model evaluation unit 1115 may evaluate whether each of the learned video learning model satisfies a predetermined criterion and may determine a model satisfying the predetermined criterion as a final data learning model. In this case, when a plurality of models satisfy the predetermined criterion, the model evaluation unit 1115 may determine any predetermined model or a predetermined number of models as the final data learning model in order of highest to lowest evaluation scores.

Meanwhile, at least one of the data acquisition unit 1111, the pre-processing unit 1112, the learning data selection unit 1113, the model learning unit 1114, or the model evaluation unit 1115 in the data learning unit 1110 may be manufactured in the form of at least one hardware chip and mounted on an electronic apparatus. For example, at least one of the data acquisition unit 1111, the pre-processing unit 1112, the learning data selection unit 1113, the model learning unit 1114, or the model evaluation unit 1115 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1111, the pre-processing unit 1112, the learning data selection unit 1113, the model learning unit 1114, and the model evaluation unit 1115 may be mounted on any electronic apparatus or separate electronic apparatuses. For example, some of the data acquisition unit 1111, the pre-processing unit 1112, the learning data selection unit 1113, the model learning unit 1114, and the model evaluation unit 1115 may be included in an electronic apparatus, and the others may be included in a server.

Also, at least one of the data acquisition unit 1111, the pre-processing unit 1112, the learning data selection unit 1113, the model learning unit 1114, or the model evaluation unit 1115 may be implemented as a software module. When at least one of the data acquisition unit 1111, the pre-processing unit 1112, the learning data selection unit 1113, the model learning unit 1114 or the model evaluation unit 1115 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The data recognition unit 1120 according to an embodiment of the present disclosure may include a data acquisition unit 1121, a pre-processing unit 1122, a recognition data selection unit 1123, a recognition result provision unit 1124, and a model update unit 1125.

The data acquisition unit 1121 may acquire a text necessary to output a speech. On the contrary, the data acquisition unit 1121 may acquire a speech necessary to output a text. The pre-processing unit 1122 may pre-process the acquired data such that the data acquired to output the speech or text can be used. The pre-processing unit 1122 may process the acquired data in a predetermined format such that the recognition result provision unit 1124 to be described below can use the data acquired to output the speech or text.

The recognition data selection unit 1123 may select data necessary to output the speech or text from the pre-processed data. The selected data may be provided to the recognition result provision unit 1124. The recognition data selection unit 1123 may select all or some of the preprocessed data according to a predetermined criterion for outputting the speech or text. Also, the recognition data selection unit 1123 may select data according to the predetermined criterion through learning by the model learning unit 1114.

The recognition result provision unit 1124 may output a speech or text by applying the selected data to the data learning model. The recognition result provision unit 1124 may apply the selected data to the data learning model by using the data selected by the recognition data selection unit 1123 as an input value. Also, the recognition result may be determined by the data learning model.

The model update unit 1125 may enable the data learning model to be updated based on the evaluation of the recognition result provided by the recognition result provision unit 1124. For example, the model update unit 1125 may enable the model learning unit 1114 to update the data learning model by providing the recognition result provided by the recognition result provision unit 1124 to the model learning unit 1114.

Meanwhile, at least one of the data acquisition unit 1121, the pre-processing unit 1122, the recognition data selection unit 1123, the recognition result provision unit 1124, or the model update unit 1125 in the data recognition unit 1120 may be manufactured in the form of at least one hardware chip and mounted on an electronic apparatus. For example, at least one of the data acquisition unit 1121, the pre-processing unit 1122, the recognition data selection unit 1123, the recognition result provision unit 1124, or the model update unit 1125 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1121, the pre-processing unit 1122, the recognition data selection unit 1123, the recognition result provision unit 1124, and the model update unit 1125 may be mounted on any electronic apparatus or separate electronic apparatuses. For example, some of the data acquisition unit 1121, the pre-processing unit 1122, the recognition data selection unit 1123, the recognition result provision unit 1124, and the model update unit 1125 may be included in an electronic apparatus, and the others may be included in a server.

Also, at least one of the data acquisition unit 1121, the pre-processing unit 1122, the recognition data selection unit 1123, the recognition result provision unit 1124, and the model update unit 1125 may be implemented as a software module. When at least one of the data acquisition unit 1121, the pre-processing unit 1122, the recognition data selection unit 1123, the recognition result provision unit 1124, or the model update unit 1125 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The present disclosure has been particularly shown and described with reference to various embodiments thereof. It will be understood by those skilled in the art that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The embodiments of the present invention can be written as computer programs and can be implemented in general-use digital computers that execute the programs using a computer-readable recording medium. Examples of the computer-readable recording medium may include storage media such as magnetic storage media (e.g., ROMs, floppy disks, hard disks, etc.), optical recording media (e.g., CD-ROMs, DVDs, etc.), etc.

What is claimed is:

1. A text-to-speech synthesis method using machine learning, the text-to-speech synthesis method comprising:

receiving an input text;

receiving an articulatory feature of a speaker;

generating output speech data for the input text reflecting the articulatory feature of the speaker by inputting the input text and the articulatory feature of the speaker to an artificial neural network text-to-speech synthesis model;

displaying current speech features corresponding to the articulatory feature of the speaker with an indicator on a predetermined shape on a screen of a user terminal;

receiving additional input of manually changing a location of the indicator on the predetermined shape with a touch on the screen of the user terminal;

adjusting the articulatory feature of the speaker in response to receiving the additional input of manually changing the location of the indicator on the predetermined shape; and converting the output speech data into speech data for the input text based on the adjusted articulatory feature of the speaker, wherein the artificial neural network text-to-speech synthesis model is learned by performing machine learning based on a plurality of learning texts and speech data corresponding to the plurality of learning texts, wherein the articulatory feature of the speaker comprises an embedding vector indicative of the articulatory feature of the speaker, wherein the embedding vector is extracted from a speech sample of the speaker, and

wherein the method further comprises:

acquiring a plurality of unit embedding vectors orthogonal to one another based on the embedding vector;

changing weights of the plurality of unit embedding vectors based on the additional input;

synthesizing an updated embedding vector by multiplying the plurality of unit embedding vectors by the changed weights; and converting the output speech data into speech data for the input text reflecting information included in the additional input by inputting the updated embedding vector to the artificial neural network text-to-speech synthesis model.

2. The text-to-speech synthesis method of claim 1, wherein the embedding vector indicative of the articulatory feature of the speaker is extracted from the speech sample of the speaker using a learned artificial neural network articulatory feature extraction model.

3. The text-to-speech synthesis method of claim 1, wherein, the embedding vector indicative of the articulatory feature of the speaker includes a prosody sub-embedding vector indicative of a prosody feature of the speaker, wherein the prosody feature includes at least one of information on utterance speed, information on accentuation, information on pause duration, or information on voice pitch, and generating the output speech data for the input text reflecting the articulatory feature of the speaker includes generating output speech data for the input text reflecting the prosody feature of the speaker by inputting the prosody sub-embedding vector indicative of the prosody feature of the speaker to the artificial neural network text-to-speech synthesis model.

4. The text-to-speech synthesis method of claim 1, wherein, the embedding vector indicative of the articulatory feature of the speaker includes an emotion sub-embedding vector indicative of an emotion feature of the speaker, wherein the emotion feature includes information on an emotion implied in what the speaker utters, and generating the output speech data for the input text reflecting the articulatory feature of the speaker comprises generating output speech data for the input text reflecting the emotion feature of the speaker by inputting the emotion sub-embedding vector indicative of the emotion feature of the speaker to the artificial neural network text-to-speech synthesis model.

5. The text-to-speech synthesis method of claim 1, wherein, the embedding vector indicative of the articulatory feature of the speaker includes a voice tone and pitch sub-embedding vector indicative of a feature related to a voice tone and pitch of the speaker, and generating the output speech data for the input text reflecting the articulatory feature of the speaker comprises generating output speech data for the input text reflecting the feature related to the voice tone and pitch of the speaker by inputting the voice tone and pitch sub-embedding vector indicative of the feature related to the voice tone and pitch of the speaker to the artificial neural network text-to-speech synthesis model.

6. The text-to-speech synthesis method of claim 1, wherein the additional input for adjusting the articulatory feature of the speaker comprises at least one of gender information, age information, regional accent information, articulation speed information, voice pitch information, or articulation level information.

7. The text-to-speech synthesis method of claim 1, wherein receiving the articulatory feature of the speaker comprises:

receiving a speech input from the speaker within a predetermined time period as the speech sample of the speaker in real time; and extracting the embedding vector indicative of the articulatory feature of the speaker from the speech sample of the speaker.

8. The text-to-speech synthesis method of claim 1, wherein receiving the articulatory feature of the speaker includes receiving an articulatory feature of a first speaker and an articulatory feature of a second speaker, wherein the first speaker is different from the second speaker, and wherein generating the output speech data for the input text reflecting the articulatory feature of the speaker includes generating output speech data for the input text reflecting the articulatory feature of the first speaker and the articulatory feature of the second speaker and by inputting the input text, the articulatory feature of the first speaker, and the articulatory feature of the second speaker to an artificial neural network text-to-speech synthesis model.

9. The text-to-speech synthesis method of claim 1, wherein the predetermined shape is a polygon.

10. A text-to-speech synthesis device, comprising:

a memory; and at least one processor connected to the memory and configured to execute computer-readable commands stored in the memory, wherein the at least one processor is configured to, receive an input text;

receive an articulatory feature of a speaker;

generate output speech data for the input text reflecting the articulatory feature of the speaker by inputting the input text and the articulatory feature of the speaker to an artificial neural network text-to-speech synthesis model;

display current speech features corresponding to the articulatory feature of the speaker with an indicator on a predetermined shape on a screen of a user terminal;

receive additional input of manually changing a location of the indicator on the predetermined shape with a touch on the screen of the user terminal;

adjusting the articulatory feature of the speaker in response to receiving the additional input of manually changing the location of the indicator on the predetermined shape; and converting the output speech data into speech data for the input text based on the adjusted articulatory feature of the speaker, wherein the artificial neural network text-to-speech synthesis model is learned by performing machine learning based on a plurality of learning texts and speech data corresponding to the plurality of learning texts, wherein the articulatory feature of the speaker comprises an embedding vector indicative of the articulatory feature of the speaker, wherein the embedding vector is extracted from a speech sample of the speaker, and wherein the at least one processor is further configured to:

acquire a plurality of unit embedding vectors orthogonal to one another based on the embedding vector;

change weights of the plurality of unit embedding vectors based on the additional input;

synthesize an updated embedding vector by multiplying the plurality of unit embedding vectors by the changed weights; and convert the output speech data into speech data for the input text reflecting information included in the additional input by inputting the updated embedding vector to the artificial neural network text-to-speech synthesis model.

11. The text-to-speech synthesis device of claim 10, wherein the embedding vector indicative of the articulatory feature of the speaker is extracted from the speech sample of the speaker using a learned artificial neural network articulatory feature extraction model.

12. The text-to-speech synthesis device of claim 10, wherein the embedding vector indicative of the articulatory feature of the speaker includes a prosody sub-embedding vector indicative of a prosody feature of the speaker, wherein the prosody feature includes at least one of information on utterance speed, information on accentuation, information on pause duration, or information on voice pitch, and wherein the at least one processor is further configured to generate output speech data for the input text reflecting the prosody feature of the speaker by inputting the prosody sub-embedding vector indicative of the prosody feature of the speaker to the artificial neural network text-to-speech synthesis model.

13. The text-to-speech synthesis device of claim 10, wherein the embedding vector indicative of the articulatory feature of the speaker includes an emotion sub-embedding vector indicative of an emotion feature of the speaker, wherein the emotion feature includes information on an emotion implied in what the speaker utters, and wherein the at least one processor is further configured to generate output speech data for the input text reflecting the emotion feature of the speaker by inputting the emotion sub-embedding vector indicative of the emotion feature of the speaker to the artificial neural network text-to-speech synthesis model.

14. The text-to-speech synthesis device of claim 10, wherein the embedding vector indicative of the articulatory feature of the speaker includes a voice tone and pitch sub-embedding vector indicative of a feature related to a voice tone and pitch of the speaker, and wherein the at least one processor is further configured to generate output speech data for the input text reflecting the feature related to the voice tone and pitch of the speaker by inputting the voice tone and pitch sub-embedding vector indicative of the feature related to the voice tone and pitch of the speaker to the artificial neural network text-to-speech synthesis model.

15. The text-to-speech synthesis device of claim 10, wherein the additional input for adjusting the articulatory feature of the speaker comprises at least one of gender information, age information, regional accent information, articulation speed information, voice pitch information, or articulation level information.

16. The text-to-speech synthesis device of claim 10, wherein the at least one processor is further configured to:

receive a speech input from the speaker within a predetermined time period as the speech sample of the speaker in real time; and extract the embedding vector indicative of the articulatory feature of the speaker from the speech sample of the speaker.

17. The text-to-speech synthesis device of claim 10, wherein the at least one processor is further configured to:

receive an articulatory feature of a first speaker and an articulatory feature of a second speaker, wherein the first speaker is different from the second speaker, and generate output speech data for the input text reflecting the articulatory feature of the first speaker and the articulatory feature of the second speaker and by inputting the input text, the articulatory feature of the first speaker, and the articulatory feature of the second speaker to an artificial neural network text-to-speech synthesis model.

18. The text-to-speech synthesis device of claim 10, wherein the predetermined shape is a polygon.

\* \* \* \* \*